United States Patent
Allen

(10) Patent No.: US 10,696,387 B2
(45) Date of Patent: Jun. 30, 2020

(54) HELICOPTER ROTOR WITH A MECHANICAL MEANS FOR CONFIGURING ROTOR TIPS TO CONTROL BROWN OUTS

(71) Applicant: Dann M Allen, Hartford City, IN (US)

(72) Inventor: Dann M Allen, Hartford City, IN (US)

( * ) Notice: Subject to any disclaimer, the term of this patent is extended or adjusted under 35 U.S.C. 154(b) by 1147 days.

(21) Appl. No.: 14/497,650

(22) Filed: Sep. 26, 2014

(65) Prior Publication Data

US 2015/0360773 A1    Dec. 17, 2015

Related U.S. Application Data

(60) Provisional application No. 61/883,268, filed on Sep. 27, 2013.

(51) Int. Cl.
| | | |
|---|---|---|
| *B64C 27/46* | (2006.01) | |
| *B64C 23/06* | (2006.01) | |
| *B64C 27/00* | (2006.01) | |
| *B64C 27/59* | (2006.01) | |

(52) U.S. Cl.
CPC .......... *B64C 27/463* (2013.01); *B64C 23/072* (2017.05); *B64C 27/006* (2013.01); *B64C 27/59* (2013.01); *Y02T 50/164* (2013.01)

(58) Field of Classification Search
CPC ..... B64C 27/463; B64C 27/59; B64C 27/006; B64C 27/605; B64C 27/615; B64C 27/625; B64C 27/64; B64C 27/68; B64C 23/065; B64C 23/069; B64C 23/072; B64C 23/076; Y02T 50/164
See application file for complete search history.

(56) References Cited

U.S. PATENT DOCUMENTS

| | | | | |
|---|---|---|---|---|
| 1,403,909 | A | | 1/1922 | Moir |
| 2,418,301 | A | * | 4/1947 | Heal ........................ B64C 3/42 244/91 |
| 2,562,905 | A | * | 8/1951 | Gadeberg ................. B64C 3/42 244/102 A |
| 3,552,689 | A | * | 1/1971 | Baekken ................ B64F 1/125 244/115 |
| 4,150,920 | A | | 4/1979 | Belko et al. |
| 4,190,219 | A | * | 2/1980 | Hackett ................ B64C 23/065 244/199.4 |
| 4,247,063 | A | * | 1/1981 | Jenkins .................... B64C 5/08 244/199.4 |
| 4,314,795 | A | | 2/1982 | Dadone |
| 4,429,844 | A | * | 2/1984 | Brown ..................... B64C 3/48 244/219 |
| 4,457,479 | A | * | 7/1984 | Daude ...................... B64C 5/08 244/199.4 |
| 4,595,160 | A | * | 6/1986 | Santos .................. B64C 23/065 244/199.4 |
| 4,671,473 | A | * | 6/1987 | Goodson ............... B64C 23/065 244/199.4 |
| 4,722,499 | A | * | 2/1988 | Klug .................... B64C 23/065 244/199.4 |

(Continued)

*Primary Examiner* — David E Sosnowski
*Assistant Examiner* — Wayne A Lambert
(74) *Attorney, Agent, or Firm* — Ritchison Law Offices, PC; John D Ritchison

(57) ABSTRACT

A helicopter rotor device with a mechanical means for configuring rotor tips in order to control dust of brown outs or the method to accomplish the reduction or elimination of the brownout dust.

13 Claims, 16 Drawing Sheets

(56) References Cited

U.S. PATENT DOCUMENTS

Figure 1A:
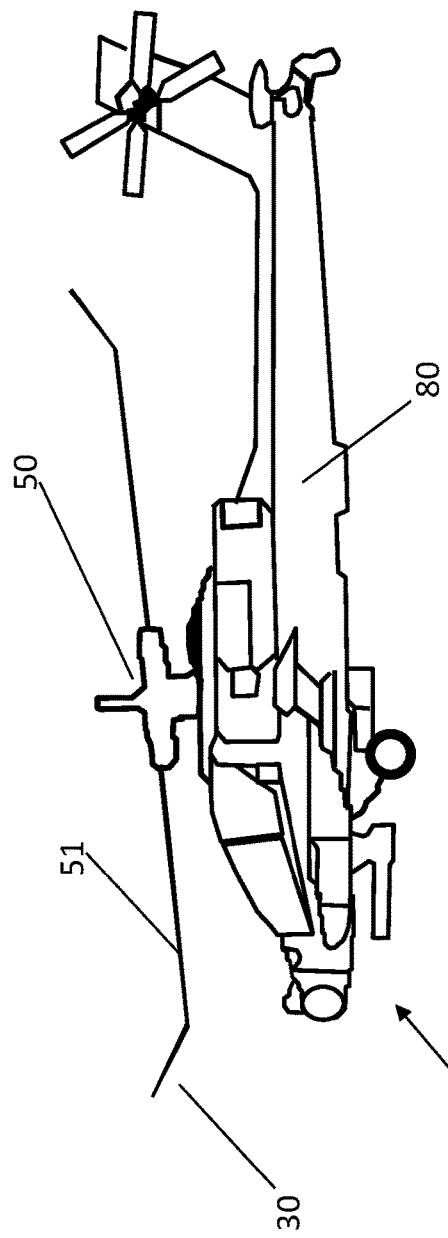

| | | | | |
|---|---|---|---|---|
| 5,156,358 | A | * | 10/1992 | Gerhardt .................. B64C 5/08 244/199.4 |
| 5,588,800 | A | * | 12/1996 | Charles ................ B64C 27/001 244/17.13 |
| 5,988,563 | A | * | 11/1999 | Allen ....................... B64C 3/42 244/45 R |
| 6,196,796 | B1 | * | 3/2001 | Lozyniak ............. B64C 27/615 416/158 |
| 6,227,487 | B1 | * | 5/2001 | Clark ...................... B64C 5/08 244/99.12 |
| 6,394,397 | B1 | * | 5/2002 | Ngo ..................... B64C 23/065 244/198 |
| 6,467,732 | B2 | * | 10/2002 | Tsukahara ............. B64C 27/463 244/17.11 |
| 7,275,722 | B2 | * | 10/2007 | Irving .................. B64C 23/065 244/201 |
| 8,019,490 | B2 | | 9/2011 | Ferren et al. |
| 8,128,035 | B2 | | 3/2012 | Malachowski et al. |
| 2004/0000619 | A1 | * | 1/2004 | Barriety .................. B64C 3/52 244/219 |
| 2006/0027703 | A1 | | 2/2006 | Bussom et al. |

* cited by examiner

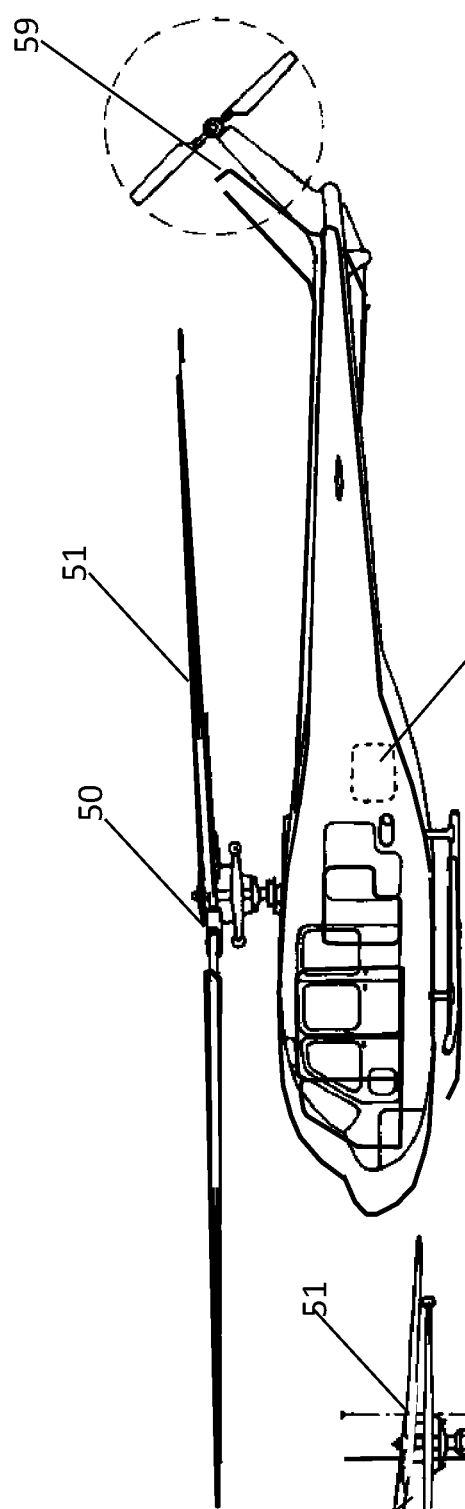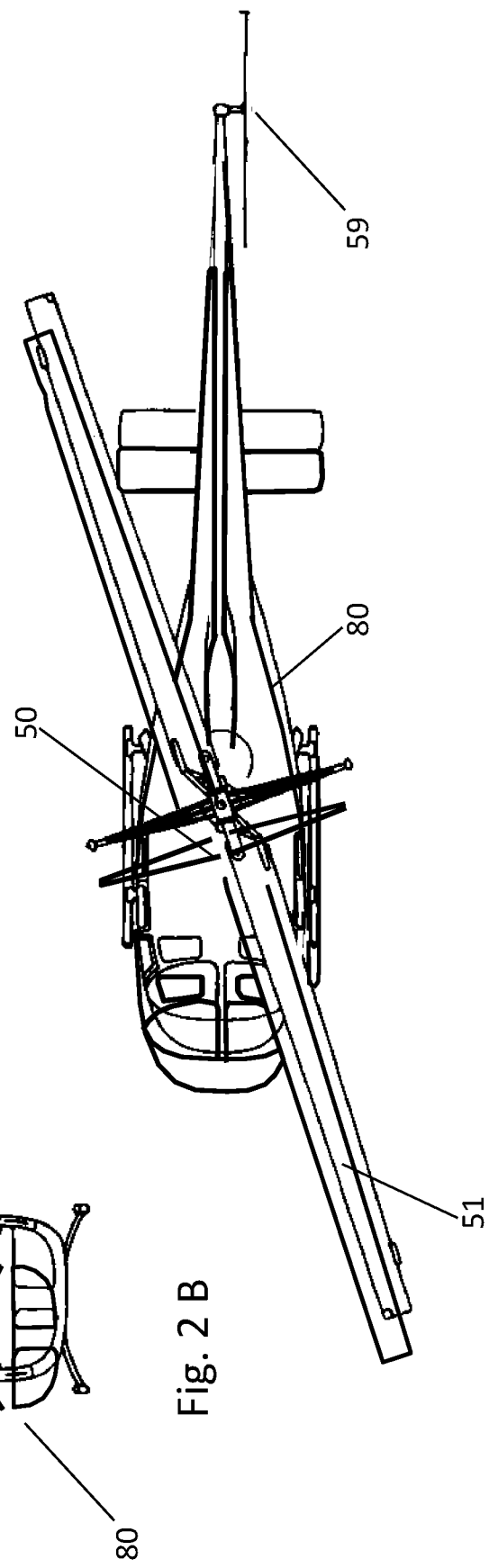
Fig. 2 A
Fig. 2 B
Fig. 2 C

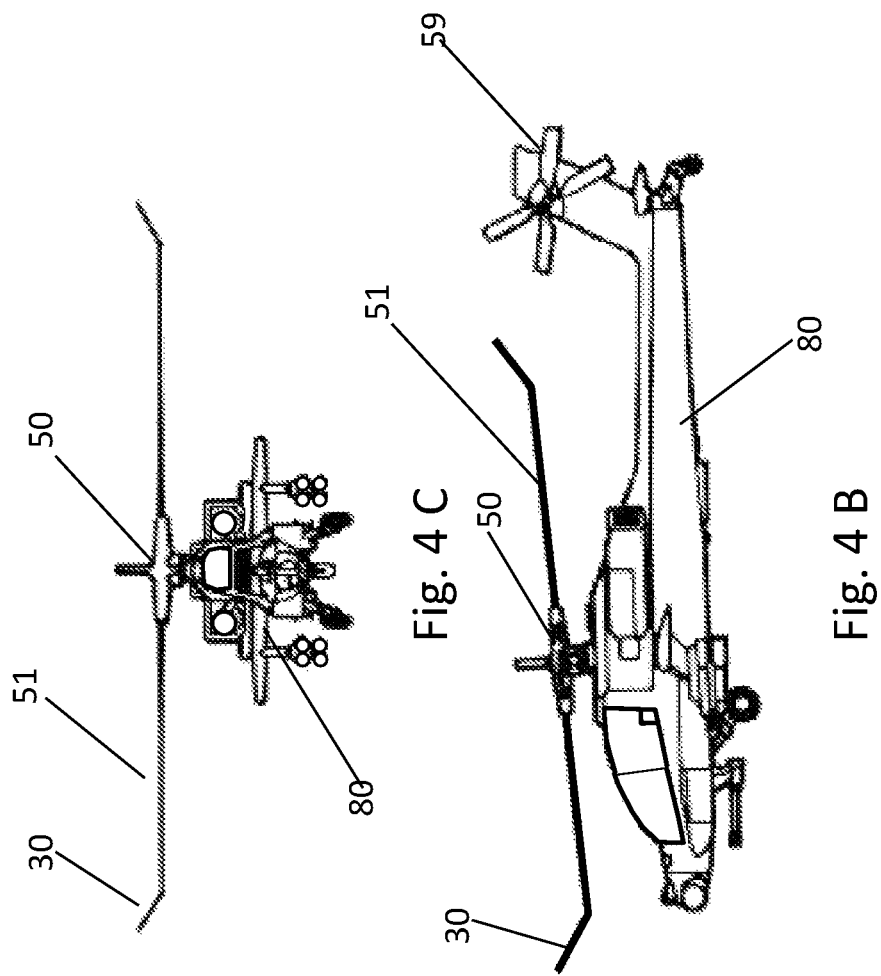
Fig. 4 C
Fig. 4 B
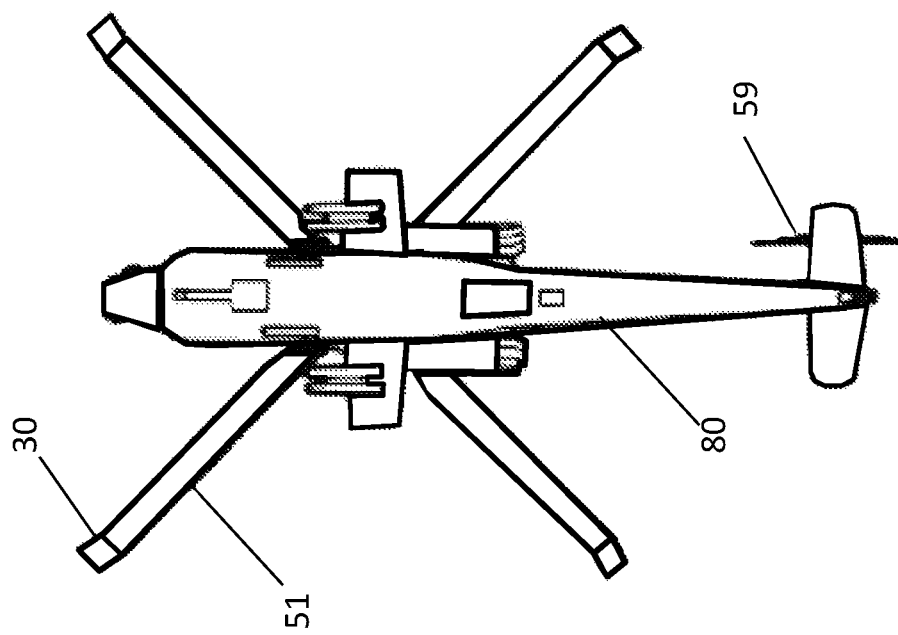
Fig. 4 A

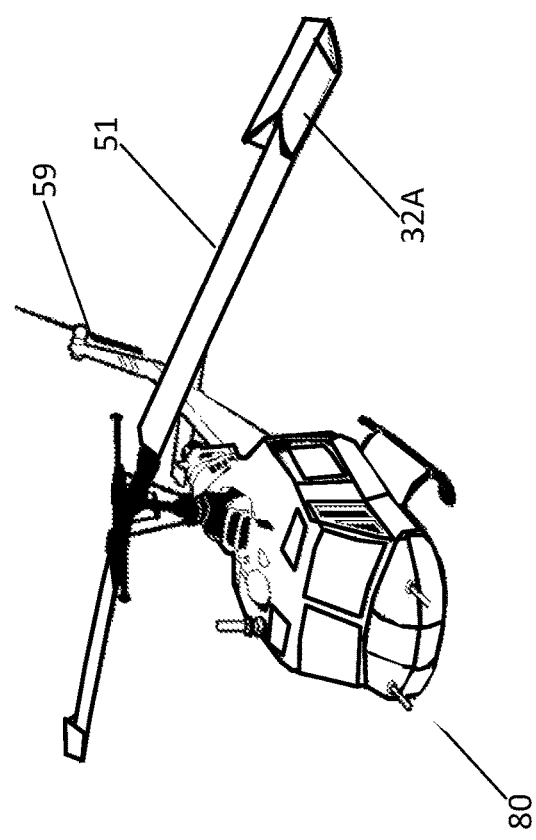
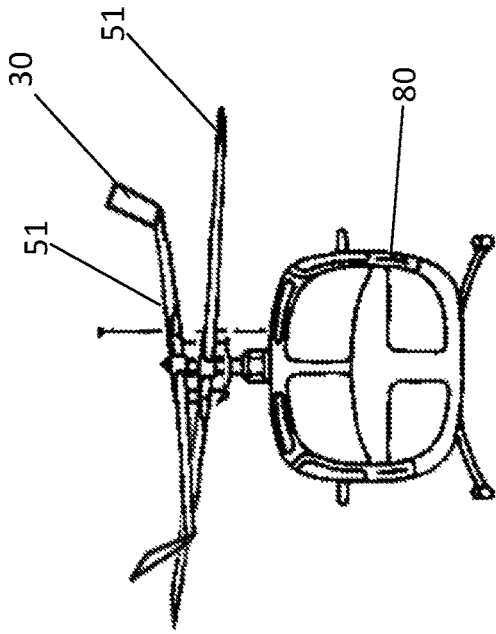
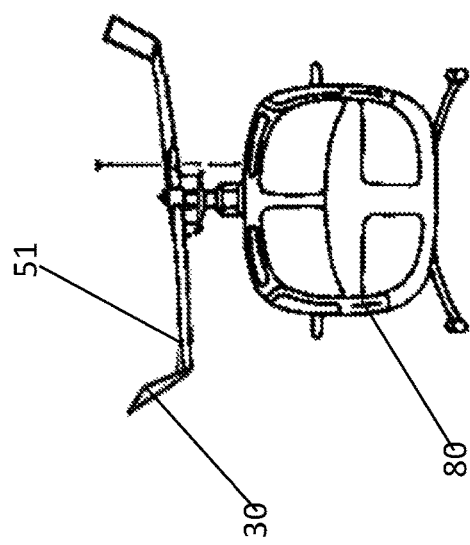
Fig. 5A
Fig. 5B
Fig. 5C
Fig. 5D

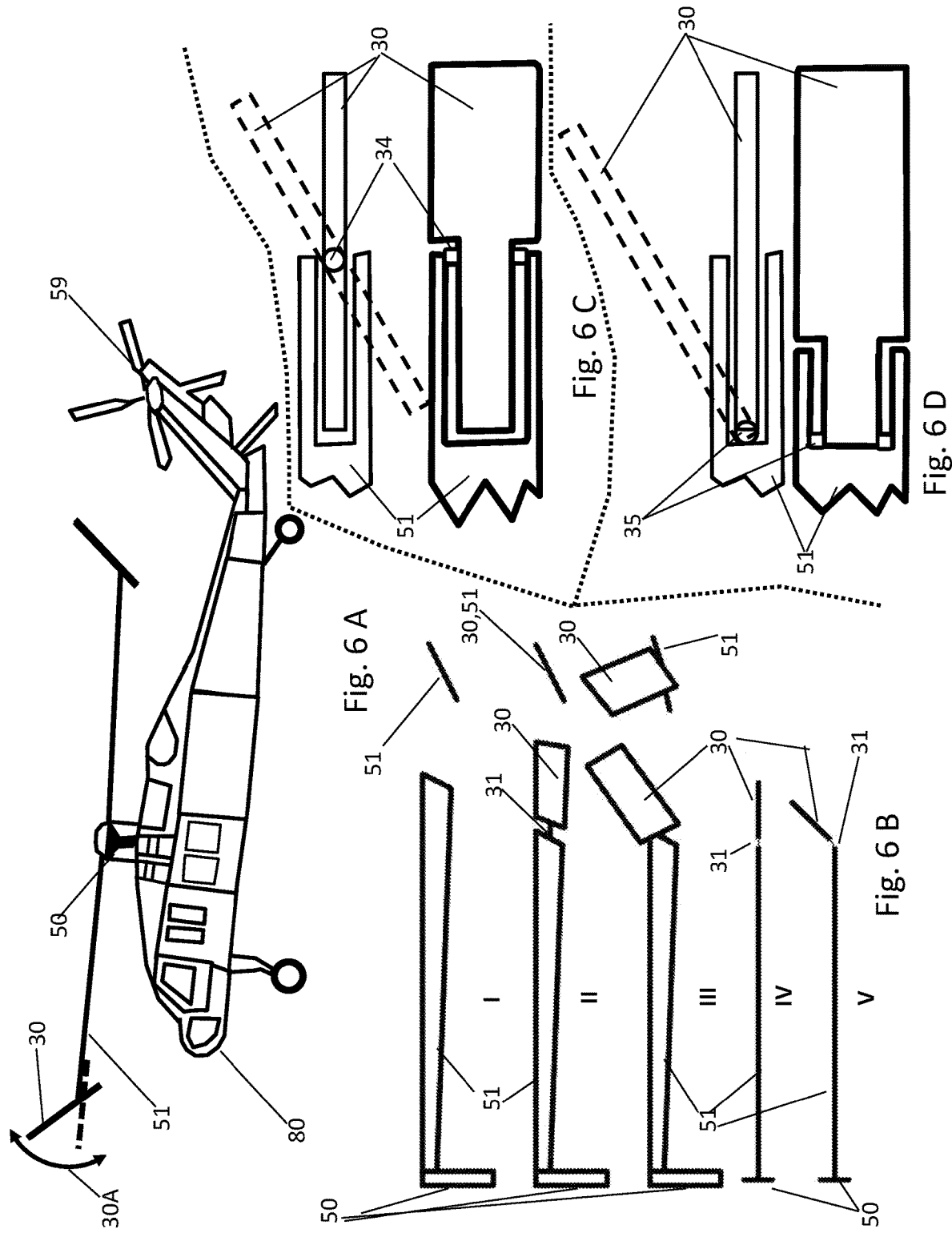

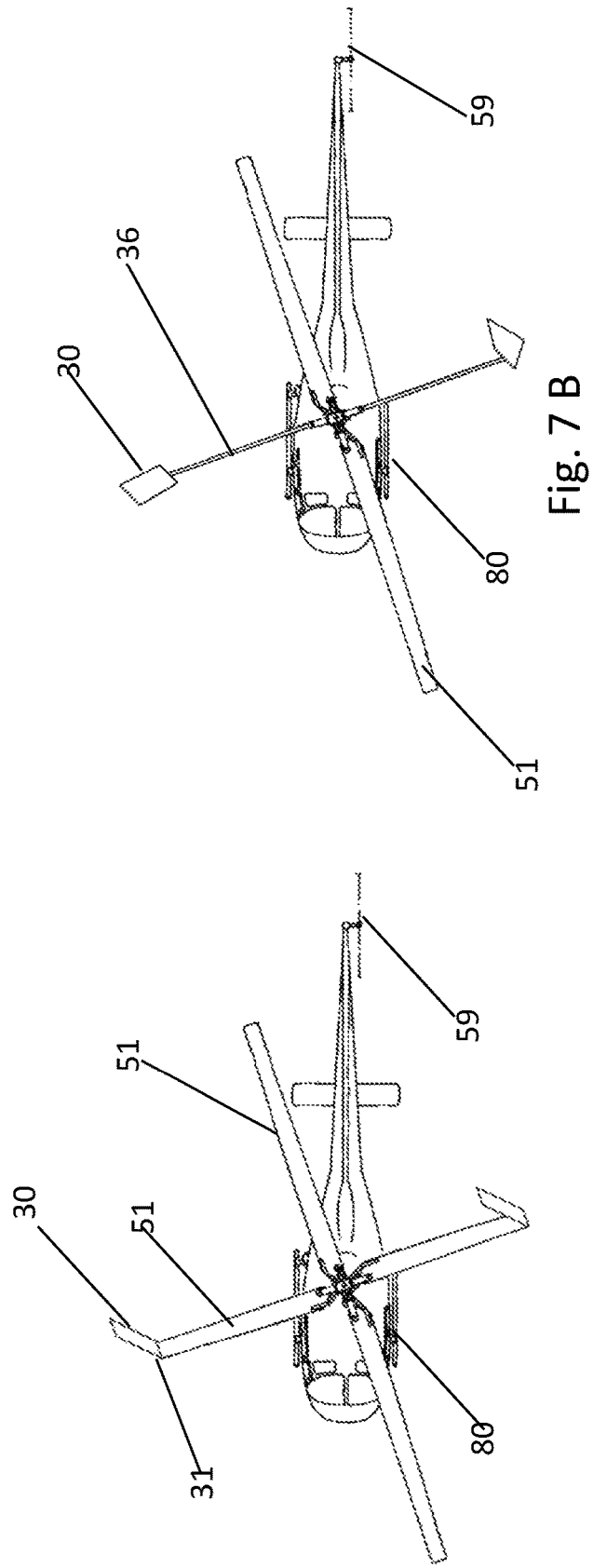
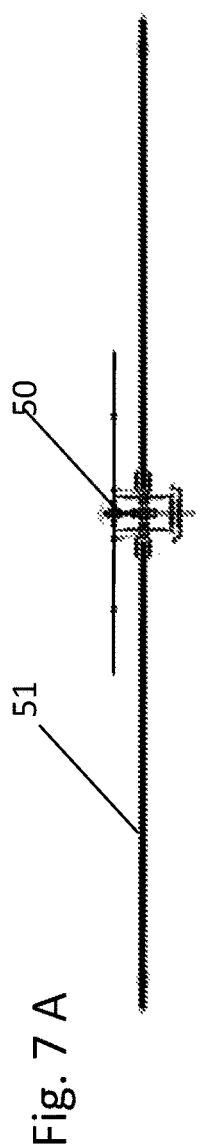
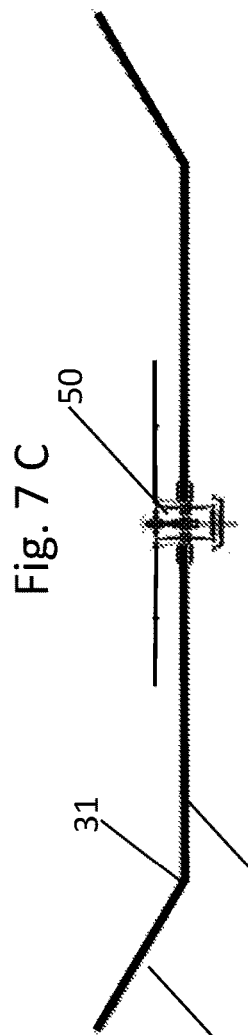
Fig. 7 A
Fig. 7 B
Fig. 7 C
Fig. 7 D

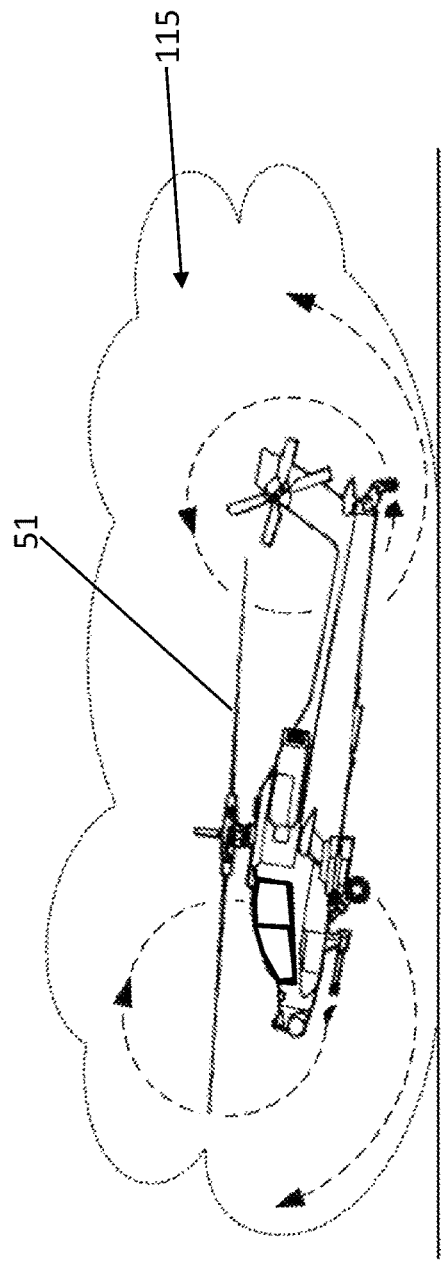
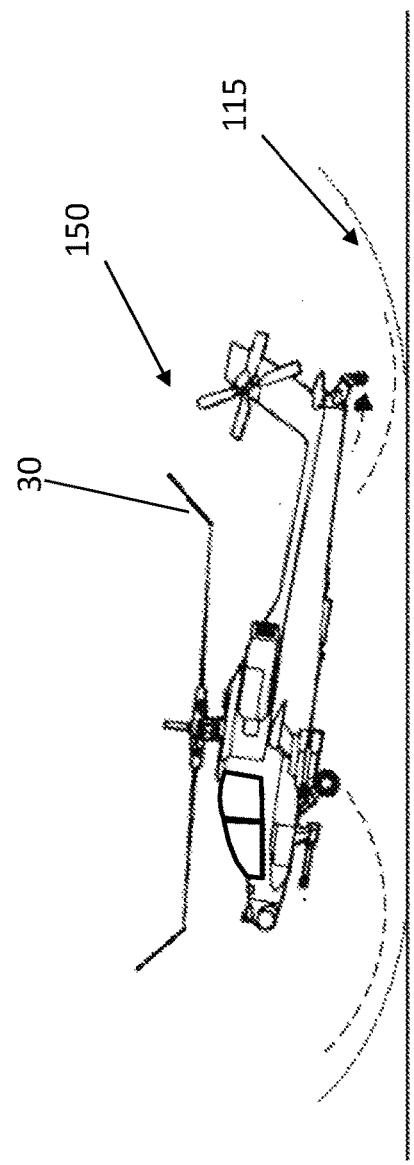
Fig. 10 A
w/o device=CLOUD
Fig. 10 B
w/ device=CLEAR

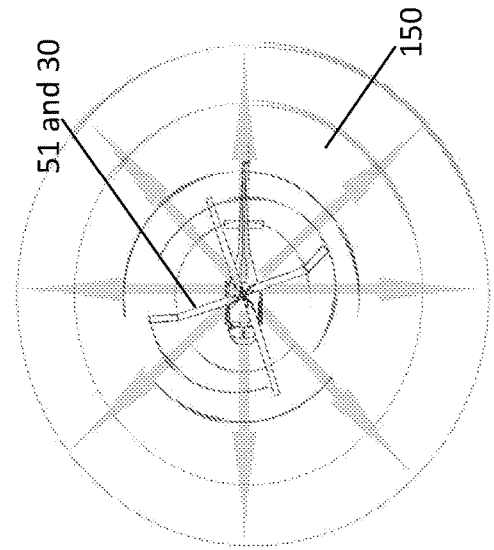
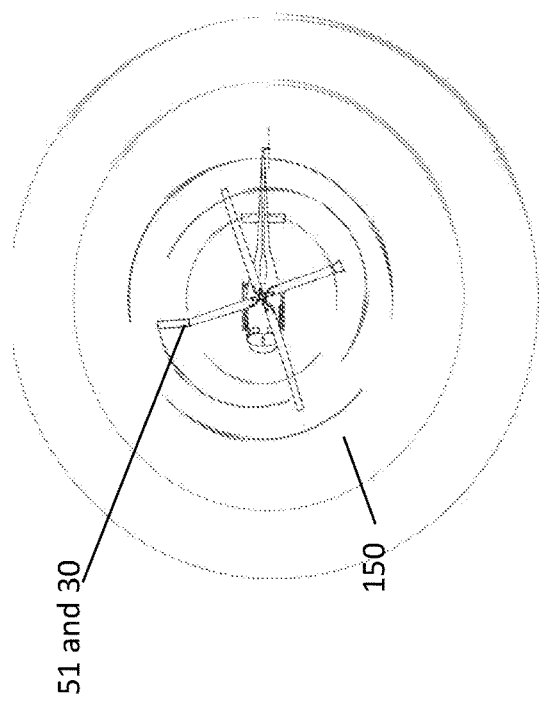
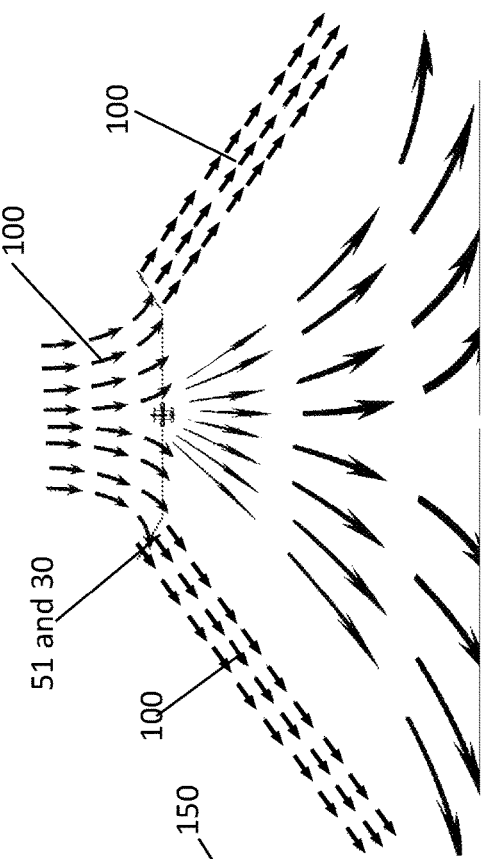
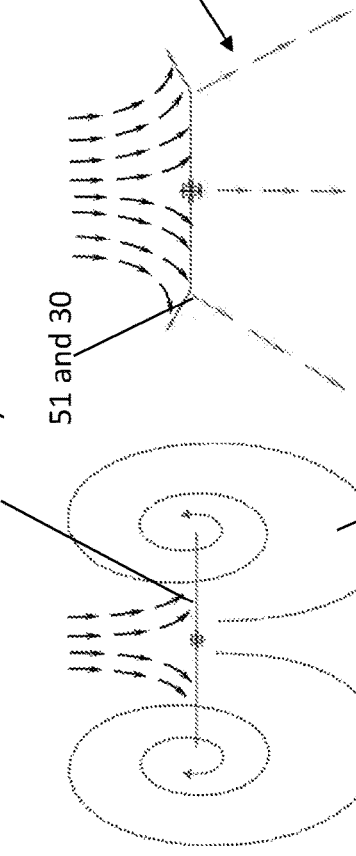

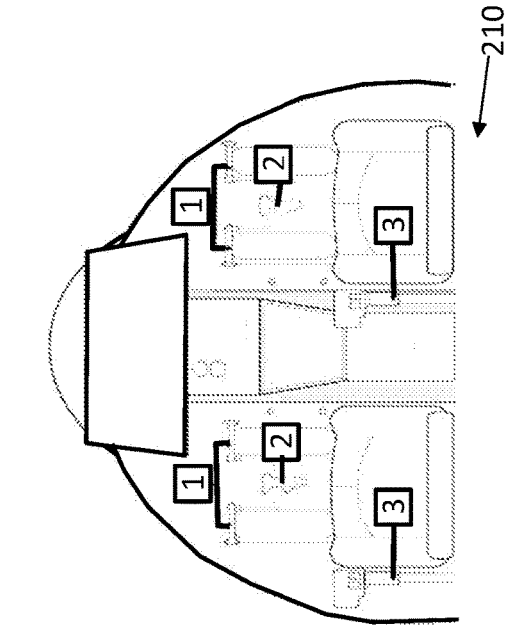
Fig. 12 B
Prior Art
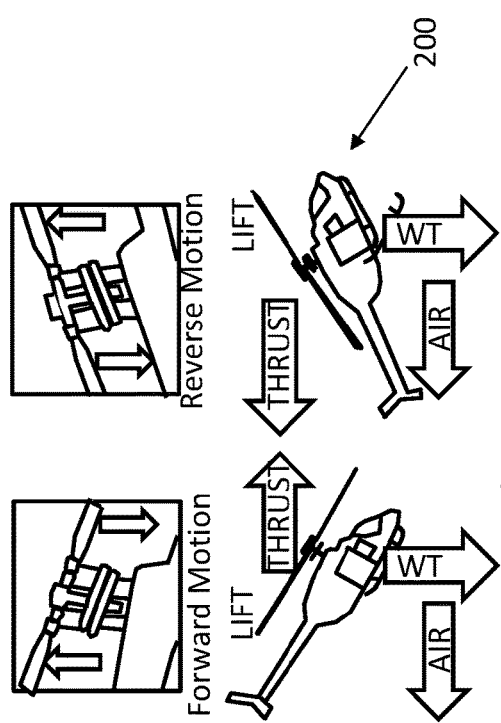
Fig. 12 A
Prior Art
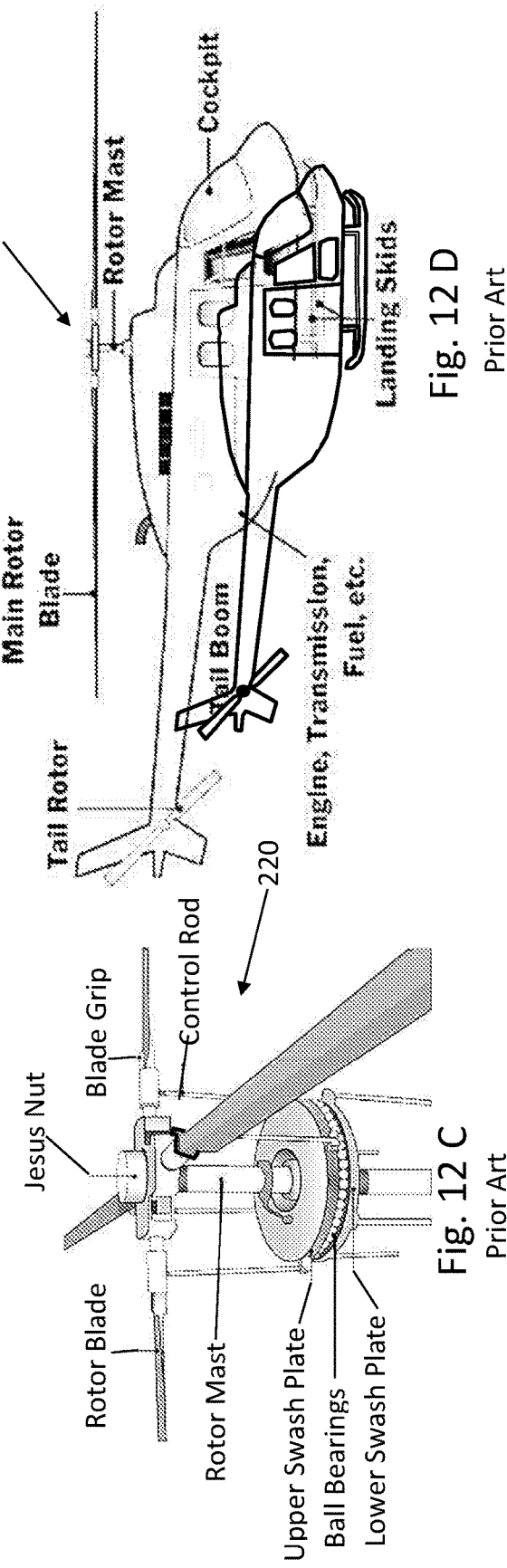
Fig. 12 D
Prior Art
Fig. 12 C
Prior Art Current airflow design

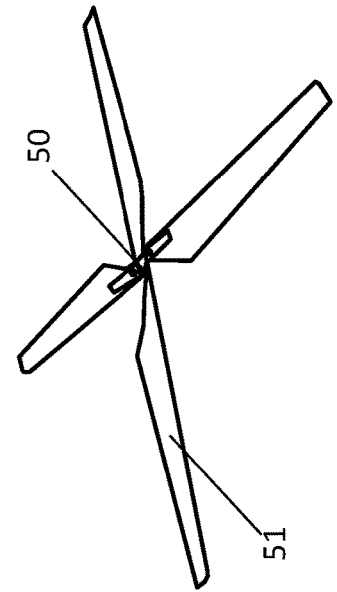
Modern Lift Equation
Lift - L
Area - A
Air Density - r
Velocity - V
$$L = Cl \, r \, \frac{V^2 A}{2}$$
Lift = coefficient x (density x velocity squared x wing area) / two
Coefficient Cl contains all the complex dependencies
← 260
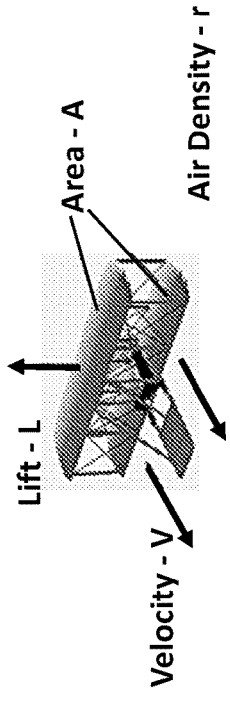
Fig. 15 B
Prior Art
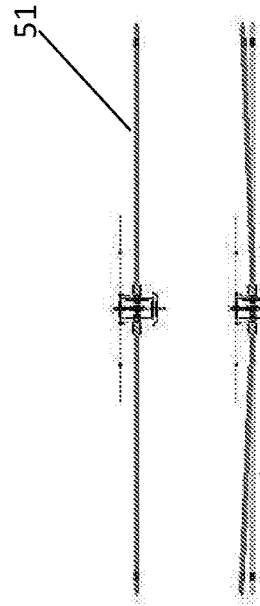
Fig. 15 D
Prior Art
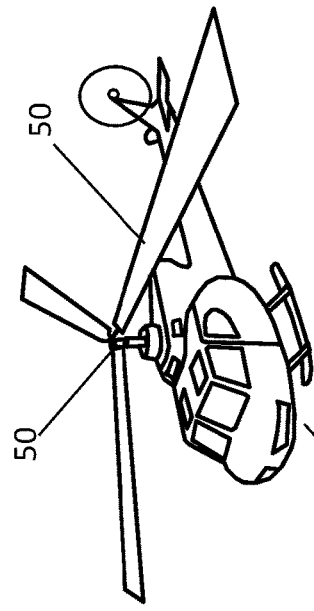
Fig. 15 A
Prior Art
Fig. 15 C
Prior Art

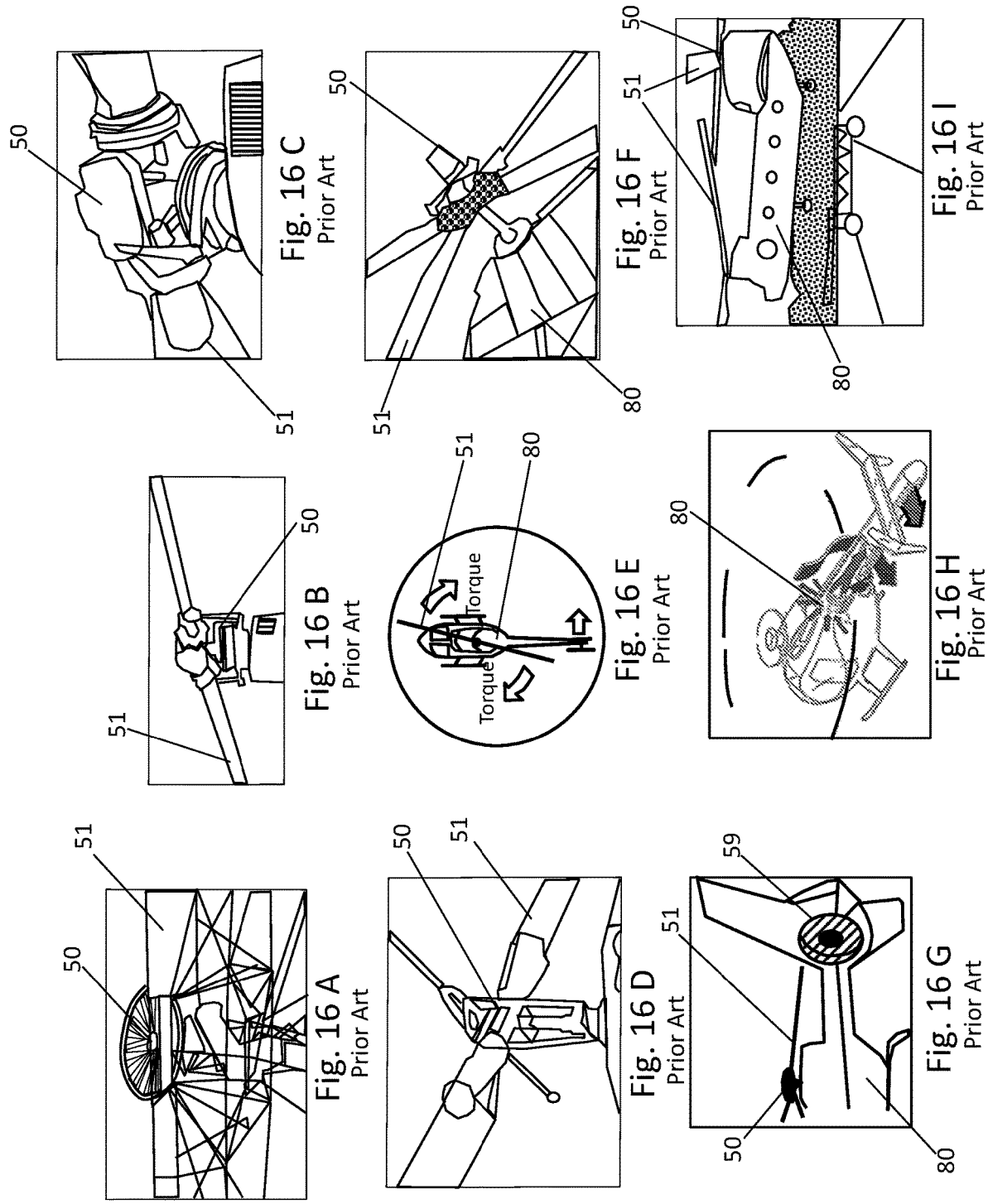

HELICOPTER ROTOR WITH A MECHANICAL MEANS FOR CONFIGURING ROTOR TIPS TO CONTROL BROWN OUTS

CROSS-REFERENCE TO RELATED APPLICATIONS

This application claims the benefit of U.S. Provisional Patent Application with Ser. No 614055 filed Sep. 27, 2013 by Dann M. Allen and entitled "A helicopter rotor with a mechanical means for configuring rotor tips to control brown outs.".

FIELD OF INVENTION

This invention relates generally to helicopter rotor blades and their cross sectional airfoil shape, in particular. The airfoils are particularly suited for use in conjunction with rotors such as those used by helicopters or other types of rotorcraft. The blades are designed so as to have a tipping action or configuration through various mechanical means. Once tipped, the air vortex pushes away the swirling dust and eliminates a brown out condition. The tipping characteristics is accomplished by using cables, hydraulics, electrical servomechanisms, cyclic/collective pitch mixing, or the application of weight adjustment means. Most modern helicopters already are designed with flexible blades and pushrods, so modifications are anticipated as minor.

Brownout is the loss of visual cues during helicopter approach and landing in dry arid regions due to recirculation of dust by the rotor wash. In a brownout, debris disturbed by the rotor wash can not only cause loss of pilot's visual cues but will start to load up the combustion air filters, which eventually could load the filters to the point where the helicopter cannot operate. Brownout and whiteout, along with water spray whiteout are serious problems for military and commercial helicopter pilots. Brownout has led to numerous aircraft and personnel losses.

This is a mechanical device or method of dust abatement to maintain cleaner engine air filters, to "spoil" typical airflow, and to restore view of the ground during approach, landing, takeoff and idling of helicopters. The method will assist in desert brownout, arctic whiteout and water spray whiteout, or wherever visibility is low due to particles in airflow created by helicopter rotors. A helicopter rotor device with a mechanical means for configuring rotor tips in order to control dust of brown outs is an innovative and more direct solution to the problem would be to disrupt the recirculation of dust particles by pushing them away from the rotor wash.

BACKGROUND—FIELD OF INVENTION and PRIOR ART

The Problem

Figure 8:
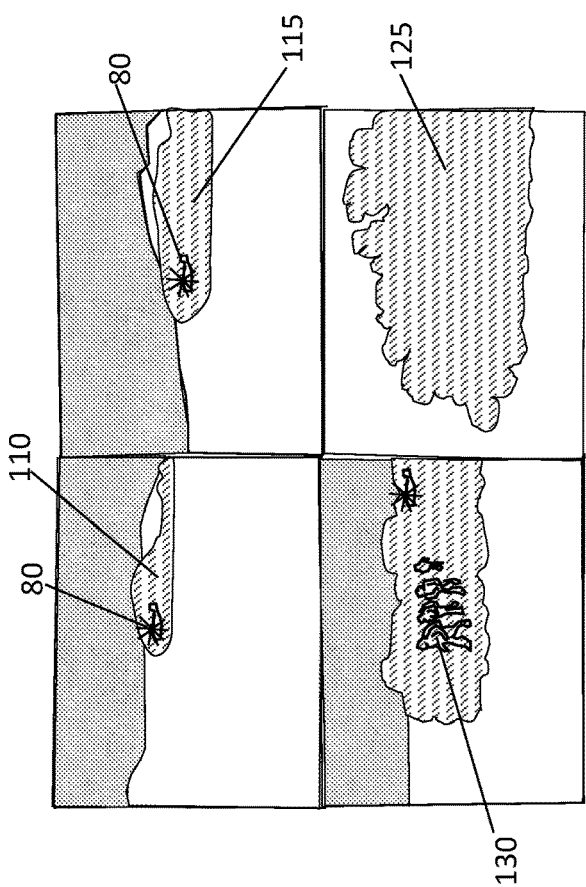
Figure 8:
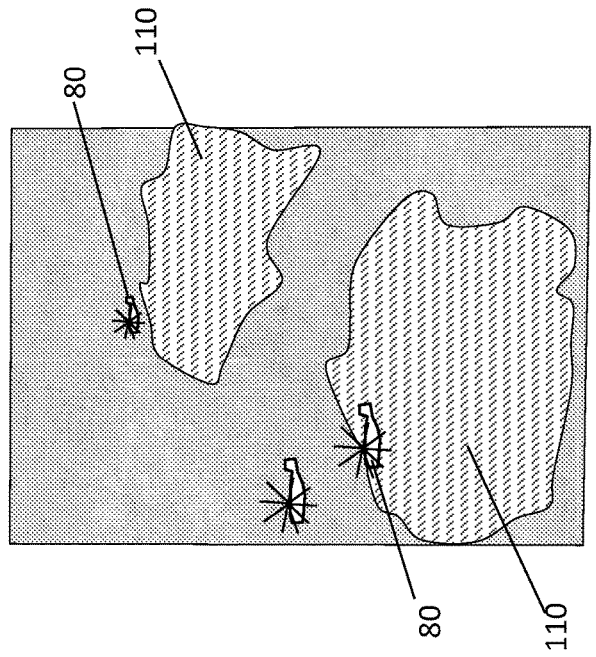
Figure 8:
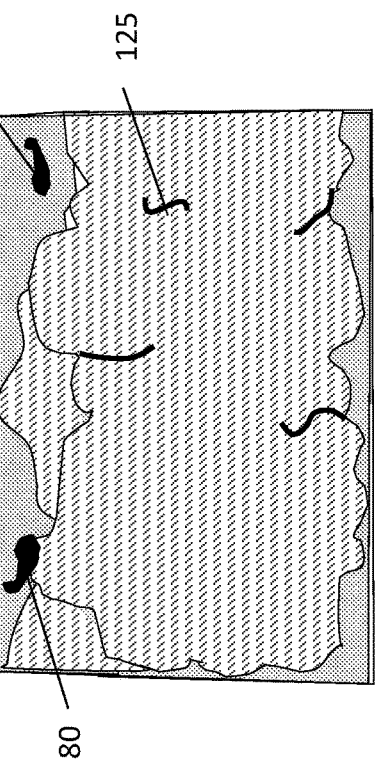
Figure 8:
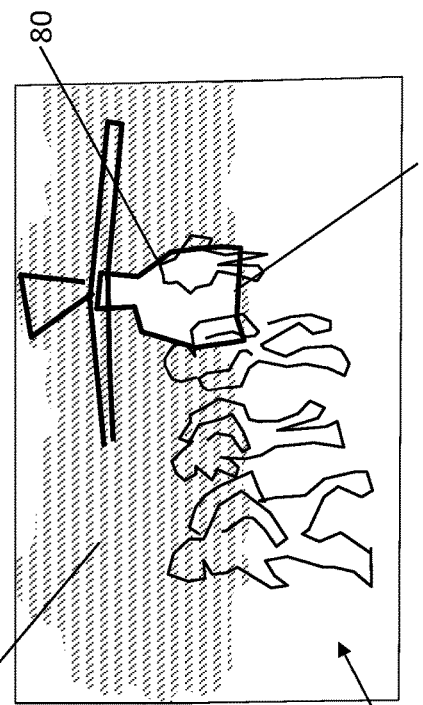

Brown outs and white outs—are the problem—See FIGS. 8 A through D, 11 C, and 11 D. Blowing sand and dust can cause an illusion of a tilted horizon. A pilot not using the flight instruments for reference may instinctively try to level the aircraft with respect to the false horizon, resulting in an accident. Helicopter rotor wash also causes sand to blow around outside the cockpit windows, possibly leading the pilot to experience the vection illusion, where the helicopter appears to be turning when it is actually in a level hover. This can also cause the pilot to make incorrect control inputs, which can quickly lead to disaster when hovering near the ground. In night landings, aircraft lighting can enhance the visual illusions by illuminating the brownout cloud.

Brownout is the loss of visual cues during helicopter approach and landing in dry arid regions due to recirculation of dust by the rotor wash. Whiteout is the loss of visual cues during helicopter approach and landing in arctic and snowy regions due to recirculation of snow by the rotor wash. In a brownout, debris disturbed by the rotor wash can not only cause loss of pilot's visual cues but will start to load up the combustion air filters, which eventually could load the filters to the point where the helicopter cannot operate. The brownouts are caused when the helicopter approaches the ground or a surface, and air from the rotor wash is forced downwards. The air then hits the ground/surface, rolling out, swirling outwards and recirculating back upward into the rotor air again, and recirculating the air again and again. The more pitch is applied to the rotors, the more air is moved through the rotor blades, causing more intense brownout conditions at landing and takeoff, and when hovering.

Prior Art

Several ideas have been developed to help with desert landings. The US military combines techniques to try and "see through" brownouts by the use of electronics and thermal imaging. They also have developed aggressive landing techniques that are dangerous and counter-intuitive for pilots. These "controlled crash" landings that are designed to reduce dust are very hard on military helicopters and compromise safety of personnel. These methods have other limitations. Thermal imaging will pick up all heat emitting objects, animate or inanimate. The thermal imaging devices do not do anything to protect the helicopter from the debris that can plug air filters. Solutions being pursued by the military services include improvements to aircraft handling and low speed instrument symbology to help the pilot stabilize the aircraft.

Other previous approaches and technological solutions have been proposed to deal with brownout:

A. Autopilot/auto-landing—Several systems now in use employ inertial navigation and/or Doppler radar to judge helicopter movement over the ground and either inform the pilot of drift or automatically fly the helicopter to a hover or to landing. These systems are adequate for stopping drift, but they do not enable the pilot to have unobstructed visual contact with the landing area and any potential obstacles.

B. Millimeter Wave Radar—A short wave radar system scans the area in front of the helicopter for terrain and obstacles. This system lacks adequate resolution and is generally too expensive to fit to all but a small number of specialized helicopters.

C. Laser Radar—In operation, this is broadly similar to millimeter wave radar but with better resolution and increased cost. As with millimeter wave radar, color representations must be artificially generated, decreasing a pilot's comprehension of his surroundings.

D. Rotor design—Several types of helicopters have less of a brownout problem than others of comparable weight due to their rotor or fuselage design. For example, the BERP (British experimental rotor program) blade tip as used on the Westland Lynx seems to reduce tip vortices and thus dust entrainment. The rotor blades on the seven-bladed Sikorsky CH-53E have non-lifting extensions at their roots, which creates an almost dust-free bubble around the cockpit. However, it is not practical to redesign and rebuild the thousands of helicopters now in service.

E. Dust Abatement—Dust abatement solutions that have been developed for helipads, utilizing palliatives that are applied in bulk, require up to 3 tons of water (not readily available in the desert) and also require up to a full day to cure. They do not work for whiteout or water spray whiteout. The palliative approach is only suitable when the helicopter's landing spot is known in advance, such as in forward operating and refueling points, but is not applicable to tactical missions or unplanned landings.

General Helicopter Background:

See FIGS. 12 through 16. A helicopter main rotor or rotor system is the combination of a rotary wing and a control system that generates the aerodynamic lift force that supports the weight of the helicopter, and the thrust that counteracts aerodynamic drag in forward flight. Each main rotor is mounted on a vertical mast over the top of the helicopter, as opposed to a helicopter tail rotor, which connects through a combination of drive shaft(s) and gearboxes along the tail boom. A helicopter's rotor is generally made of two or more rotor blades. The blade pitch is typically controlled by a swash plate connected to the helicopter flight controls. Helicopters are one example of rotary-wing aircraft.

The helicopter rotor is powered by the engine, through the transmission, to the rotating mast. The mast is a cylindrical metal shaft that extends upward from—and is driven by—the transmission. At the top of the mast is the attachment point for the rotor blades called the hub. The rotor blades are then attached to the hub. Main rotor systems are classified according to how the main rotor blades are attached and move relative to the main rotor hub. There are three basic classifications: rigid, semi-rigid, or fully articulated, although some modern rotor systems use an engineered combination of these classifications. The rotors are designed to operate in a narrow range of RPM.

Unlike the small diameter fans used in turbofan jet engines, the main rotor on a helicopter has a large diameter that lets it accelerate a large volume of air. This permits a lower downwash velocity for a given amount of thrust. As it is more efficient at low speeds to accelerate a large amount of air by a small degree than a small amount of air by a large degree, a low disc loading (thrust per disc area) greatly increases the aircraft's energy efficiency and this reduces the fuel use and permits reasonable range.

The simple rotor (see FIG. 12 C) normally includes: one swash plate (whose link rods drive the pitch hinges, allowing the blades to twist about the axis extending from blade root to blade tip); teeter hinge, allowing one blade to rise vertically while the other falls vertically (this motion occurs whenever translational relative wind is present, or in response to a cyclic control input); scissor link and counterweight (which carries the main shaft rotation down to the upper swash plate); rubber covers protect moving and stationary shafts; another swash plates (which transmits cyclic and collective pitch to the blades [remember the top one rotates]); three non-rotating control rods transmit pitch information to the lower. Swash plate; and a main mast leading down to main gearbox.

Swash Plate

Controls vary the pitch of the main rotor blades cyclically throughout rotation. The pilot uses this to control the direction of rotor thrust vector (the part of the rotor disc where the maximum thrust develops, front, rear, right side, etc.). Collective pitch varies the magnitude of rotor thrust (increasing or decreasing thrust over the whole rotor disc at the same time). These blade pitch variations are controlled by tilting, and raising or lowering, the swash plate with the flight controls. The vast majority of helicopters maintain a constant rotor speed (RPM) during flight, leaving the angle of attack of the blades as the sole means of adjusting thrust from the rotor. The swash plate is two concentric disks or plates. One plate rotates with the mast, connected by idle links, while the other does not rotate. The rotating plate is also connected to the individual blades through pitch links and pitch horns. The non-rotating plate is connected to links that are manipulated by pilot controls-specifically, the collective and cyclic controls. The swash plate can shift vertically and tilt. Through shifting and tilting, the non-rotating plate controls the rotating plate, which in turn controls the individual blade pitch.

Rigid Rotor

The term "rigid rotor" usually refers to a hinge-less rotor system with blades flexibly attached to the hub. A rigid rotor system is mechanically simpler than a fully articulated rotor system. Loads from flapping and lead/lag forces are accommodated through rotor blades flexing, rather than through hinges. By flexing, the blades themselves compensate for the forces that previously required rugged hinges. The result is a rotor system that has less lag in control response, because the rotor has much less oscillation. The rigid rotor system also negates the danger of mast bumping inherent in teetering rotors.

Semi-Rigid Rotor

The semi-rigid rotor can also be referred to as a teetering or seesaw rotor. This system is normally composed of two blades that meet just under a common flapping, or teetering hinge at the rotor shaft. This allows the blades to flap together in opposite motions like a seesaw. This under slinging of the blades below the teetering hinge, combined with an adequate dihedral or coning angle on the blades, minimizes variations in the radius of each blade's center of mass from the axis of rotation as the rotor turns, which in turn reduces the stress on the blades from lead and lag forces caused by coriolis effect. Secondary flapping hinges may also be provided to provide sufficient flexibility to minimize bouncing. Feathering is accomplished by the feathering hinge at the blade root, which allows changes to the pitch angle of the blade.

Combination

Modern rotor systems may use the combined principles of the rotor systems mentioned above. Some rotor hubs incorporate a flexible hub, which allows for blade bending (flexing) without the need for bearings or hinges. These systems, called "flexures", are usually constructed from composite material. Elastomeric bearings may also be used in place of conventional roller bearings. Elastomeric bearings are bearings constructed from a rubber type material, and provide limited movement that is perfectly suited for helicopter applications. Flextures and elastomeric bearings require no lubrication and, therefore, require less maintenance. They also absorb vibration, which means less fatigue and longer service life for the helicopter components.

Blade Design

The blades of a helicopter are long, narrow airfoils with a high aspect ratio, a shape that minimizes drag from tip vortices (see the wings of a glider for comparison). They generally contain a degree of washout that reduces the lift generated at the tips, where the airflow is fastest and vortex generation would be a significant problem. Rotor blades are made out of various materials-including aluminum, composite structure, and steel or titanium—with abrasion shields along leading edge. Rotorcraft blades are traditionally passive, but research into active blade control trailing edge flaps is underway. Tips of some helicopter blades can be especially designed to reduce turbulence, noise, and provide more efficient flying.

More explanations about the Nature of the Brown out problem addressed: See FIGS. 8 A through D, 11 C, and 11 E Brown Outs—Problem Rotor wash from a helicopter landing or hovering in ground effect in a dusty or sandy environment can throw enough dust into the air to instantly create zero visibility conditions. When helicopters approach for landing on a dusty or snow-covered landing field, whirling dust or snow suddenly and greatly restricts visibility in the final phase of the landing. This phenomenon, referred to as "brownout" or "whiteout", presents a significant risk in VFR (Visual Flight Rules) landings. The pilot can become disoriented with respect to the aircraft's attitude and altitude relative to the ground, as the whirling dust or snow gives him the impression that the helicopter is banking or nosing down. This situation frequently leads to accidents, and is the single most frequent cause of all helicopter crashes.

The article entitled "Brown-out survival—technology or training?" in the periodical "Defence Helicopter," Shepard, pp. 10-12, February/March 2004 issue, gives an instructive introduction to the problem of brownouts or whiteouts and suggests first approaches to technical solutions, which will be discussed briefly below. Helicopters frequently need to land in certain parts of the world where there is very fine sand and dust. Under a variety of circumstances determined by soil content and moisture, atmospheric conditions, and flight profile, the descending helicopters aerosolize this sand and dust with the downwash air stream from their rotor blades. Fine-grained dust and sand can stay aloft for up to 30 minutes after a landing. The resulting dust clouds create very dangerous low/zero visibility conditions at an extremely mission-critical time. This has resulted in the inability of the crew to execute their mission, damage to equipment, injury, and death. Blowing sand and dust can cause an illusion of a tilted horizon. A pilot not using the flight instruments for reference may instinctively try to level the aircraft with respect to the false horizon, resulting in an accident. Helicopter rotor wash also causes sand to blow around outside the cockpit windows, possibly leading the pilot to experience the vection illusion, where the helicopter appears to be turning when it is actually in a level hover. This can also cause the pilot to make incorrect control inputs, which can quickly lead to disaster when hovering near the ground. In night landings, aircraft lighting can enhance the visual illusions by illuminating the brownout cloud. Several coalition military aircraft were lost due to roll-overs while executing dust landings during the Gulf War period of 1990-91. In the decade between then and Operation Enduring Freedom, the U.S. Army recorded over 40 cases of brownout condition accidents during training at the Fort Irwin Military Reservation National Training Center in California, and other various sites. Since 1991, there have been over 230 cases of aircraft damage and/or injury due to unsuccessful take-offs or landings in a dust environment. Although the majority of the incidents occur during landings, there have been a significant number of incidents occurring during take-offs as well. For the more than 50 brown-out incidents with damage reported to date during Army military operations in the 2001-2007 time frame, 80 percent were during landings and 20 percent during takeoffs.

Helicopter brownout is a US$100 million per year problem for the U.S. Military in Afghanistan and Iraq. The Army cites brownout in three out of every four helicopter accidents there. Brownout accidents occur close to the ground and at low airspeed, giving these accidents a higher survivability than other types. However, there have been deaths in military accidents in Iraq and Afghanistan, and nearly all of those were preventable

SUMMARY OF THE INVENTION

A helicopter rotor device with a mechanical means for configuring rotor tips in order to control dust of brown outs or the method to accomplish the elimination of the brownout dust is presented here. This invention addresses these above stated problems by providing mechanical method of dust abatement to maintain cleaner engine air filters, to "spoil" typical airflow, and to restore view of the ground during approach, landing, takeoff and idling of helicopters. The method will assist in desert brownout, arctic whiteout and water spray whiteout, or wherever visibility is low due to particles in airflow created by helicopter rotors. The mechanical method of dust abatement to maintain cleaner engine air filters, to "spoil" typical airflow, and to restore view of the ground during approach, landing, takeoff and idling of helicopters. The method will assist in desert brownout, arctic whiteout and water spray whiteout, or wherever visibility is low due to particles in airflow created by helicopter rotors.

Ways to accomplish the rotor tipping are mechanical means that include configuring rotor tips of a platform's pushrods, adding another command to the function of the swash plates (or oscillating bearings) using cables, hydraulics, electrical servomechanisms, cyclic/collective pitch mixing, or the application of weight adjustment using any of these means. [Note that modern helicopters already are designed with flexible blades and pushrods, so modifications needed would be minor. Once the rotor blades are adapted with the feature, they can be used in any location and will clear the air for a less obstructed view and will improve air quality around engine intakes. By adding one or more sets of spoilers to the rotors at or near the ends of the blades, the blades will divert the typical air flow, "spoiling" the recirculation of the debris. The pilot and/or computer will have control over the adjustable spoilers to add or decrease the amount of air disruption is needed.

The new design will push the dust- or debris-filled air further and lower than in the typical airflow. The new idea should force the air outward and downward, keeping the debris or dust lower to the ground, so that it is not recirculated. This will allow the rotors to pull in cleaner air from above, leading to a clearer view. Once on the surface, the new tips could be adjusted to a very aggressive position and used to clear the area of dust and debris, creating a giant fan effect, and pushing the dirty air away to increase vision and improve air quality for the pilot and machinery.

Objects and Advantages

Advantages and Benefits

| Item | Advantages |
|---|---|
| 1 | Simple mechanical means to tilt the tips of the rotor blades |
| 2 | Safe adaptation to existing rotor blades of helicopters |
| 3 | A way to save lives |
| 4 | A way to save equipment and the cost of replacing lost equipment |

DESCRIPTION OF THE DRAWINGS—FIGURES

The accompanying drawings, which are incorporated in and constitute a part of this specification, illustrate an embodiment of the device that is preferred. The drawings together with the summary description given above and a detailed description given below serve to explain the principles of a mechanical rotor tip blade device or method to eliminate brown outs. It is understood, however, that the mechanical rotor tip blade device or method to eliminate brown outs is not limited to only the precise arrangements and instrumentalities shown.

Figure 1B:
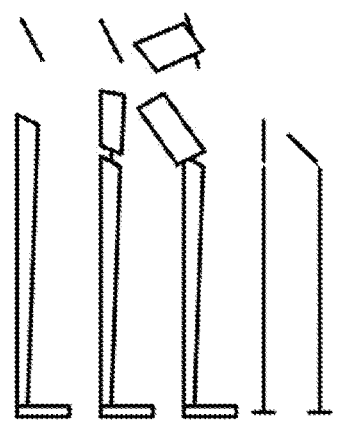
Figure 1C:
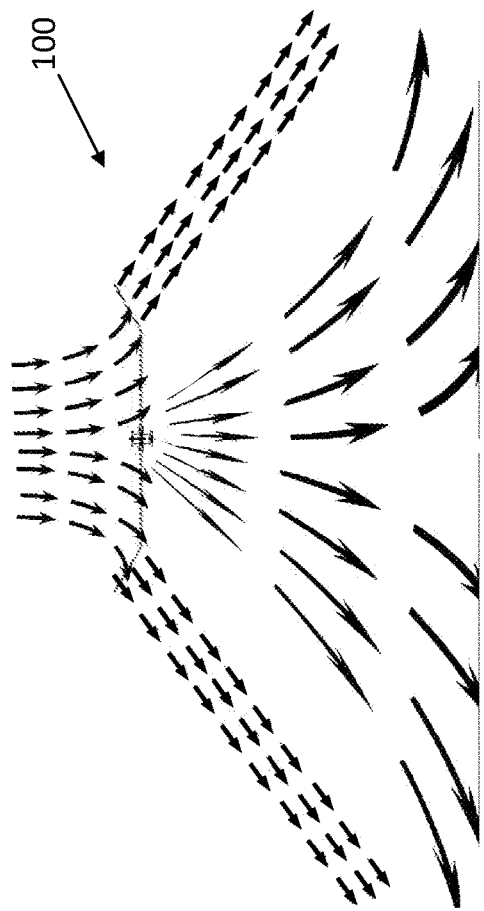

FIGS. 1 A through 1 C are general sketches of helicopters with mechanical rotor tips on the blades, an array of means for tipping the blades, and a typical vortex flow lines of the air movement (wind) and dust.

FIGS. 2 A through 2 C are side, top and end views of a typical helicopter before adaptation of the rotor tips.

Figure 3:
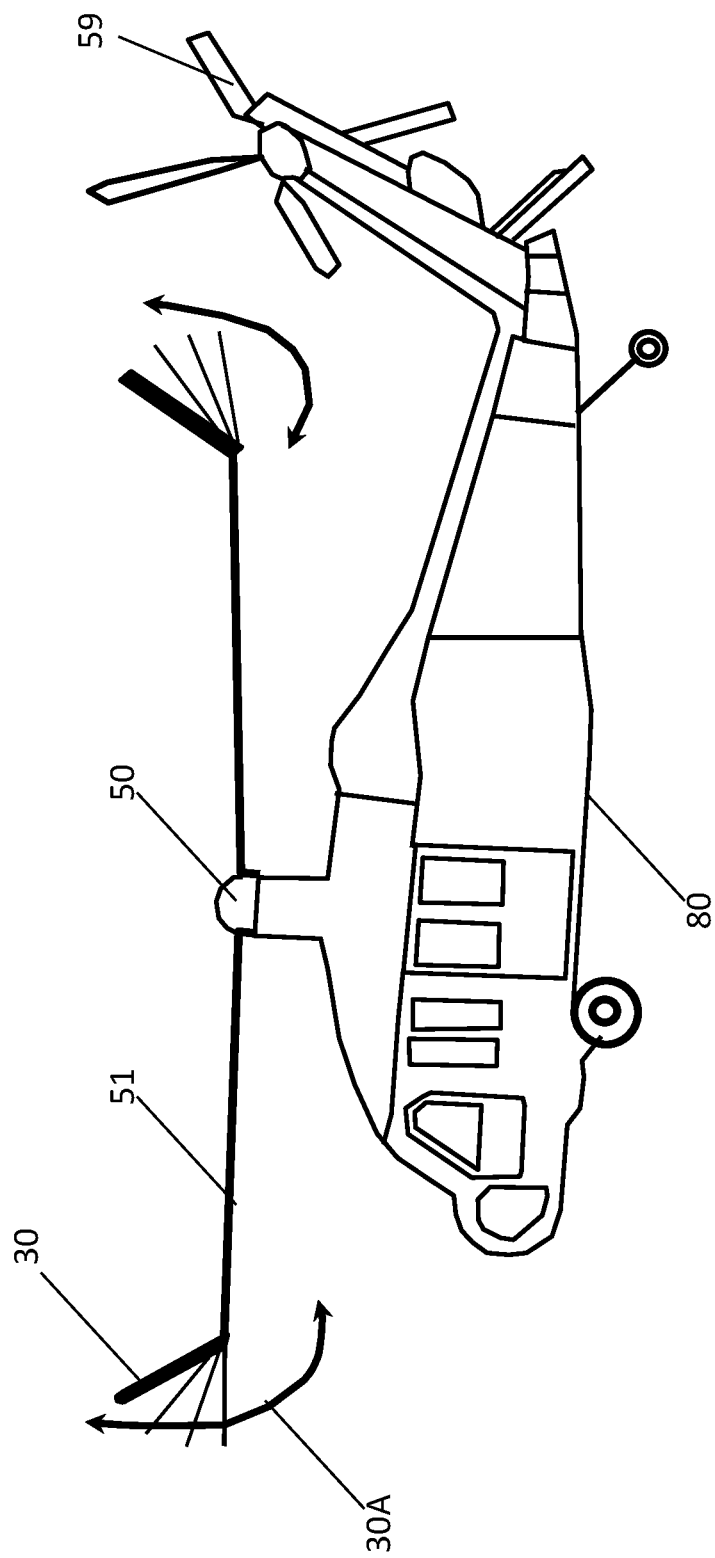

FIG. 3 is a typical helicopter after adaptation of the rotor tips.

FIGS. 4 A through 4 C are side, bottom and end views of a typical helicopter after adaptation of the rotor tips.

FIGS. 5 A through 5 D are flap tipping options and multiple blade options of the rotor tip adaptation for helicopter blades.

FIGS. 6 A through 6 D are optional means to accomplish the rotor tip adaptation for helicopter blades.

FIGS. 7 A through 7 D are Tipping and straight blade designs along with an optional straight blade and rod structure with rotor tops at the ends.

FIGS. 8 A through 8 D are examples of brown out conditions and resulting dust clouds during helicopter landings and lift-offs.

Figure 9:
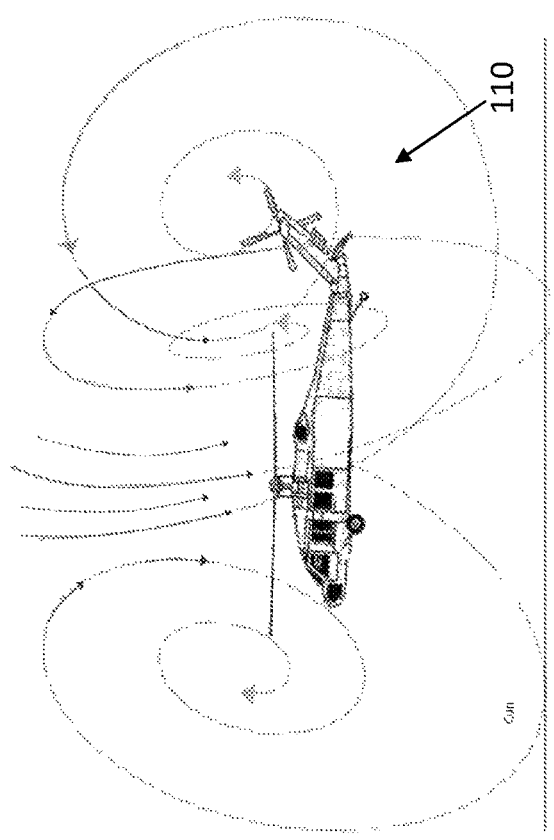
Figure 9:
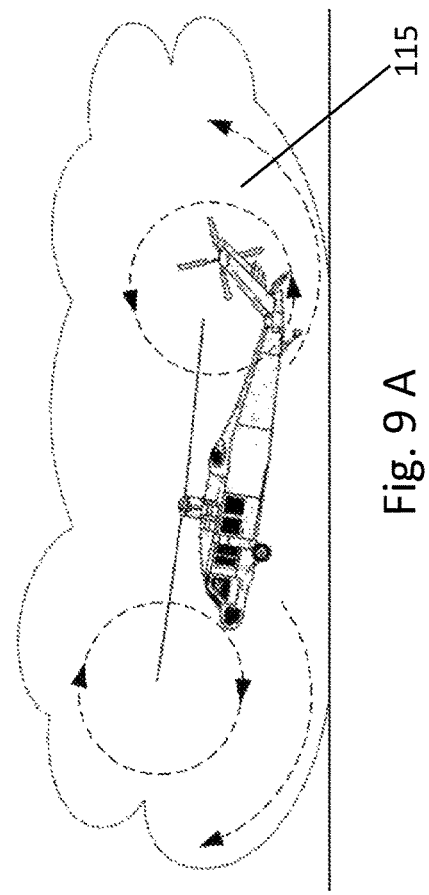
Figure 9:
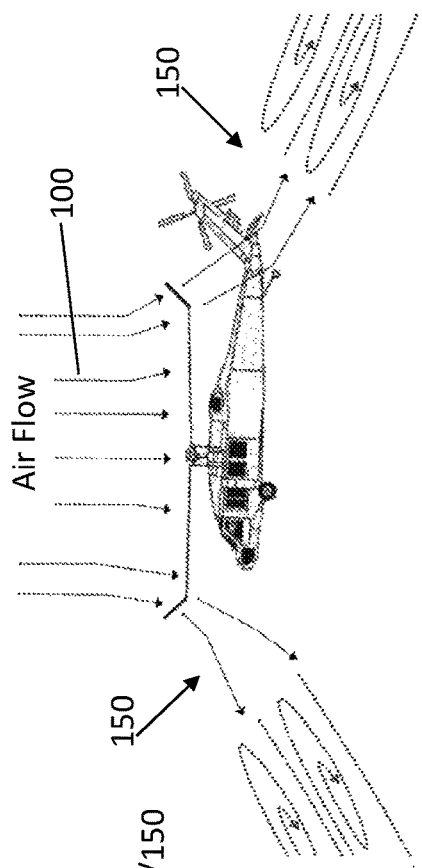
Figure 9:
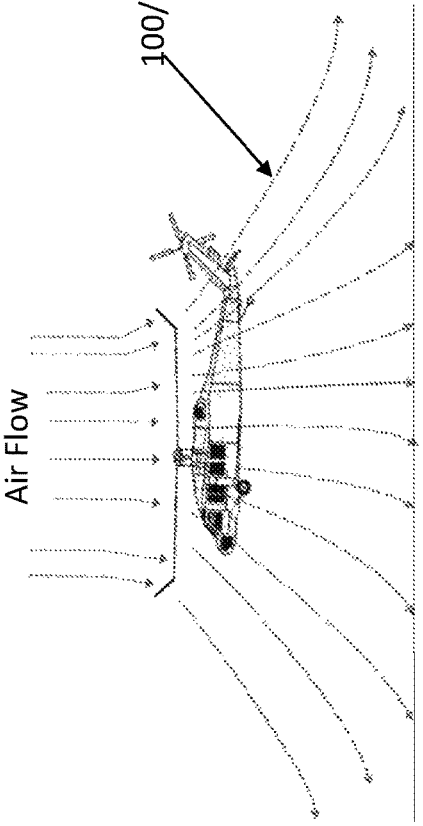

FIGS. 9 A through 9 D are sketches of vortexes of air movement and dust that compare blades with and without end rotor tipping.

FIGS. 10 A and 10 B are sketches of vortexes of air movement and dust that compare blades—with and without end rotor tipping—during the landing and lift-off conditions.

FIGS. 11 A through 11 E are sketches of top and side views of vortexes of air movement and dust that compare blades with and without end rotor tipping phenomena.

FIGS. 12 A through 12 D are typical reference sketches of how helicopters fly, the cockpit, the rotor mast parts, and the typical parts of a helicopter.

Figure 13:
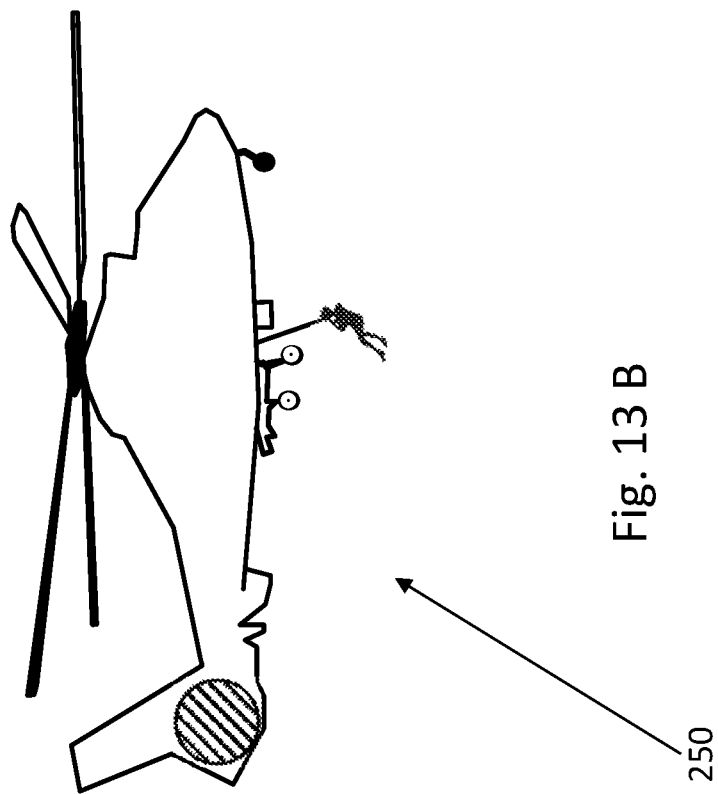
Figure 13:
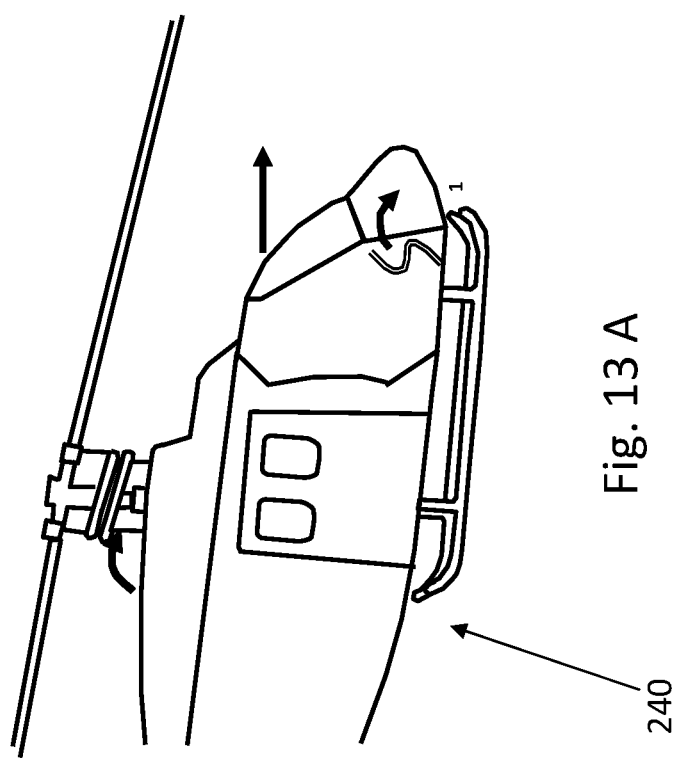

FIGS. 13 A and 13 B are helicopter reference sketches portraying directional flight and hovering.

Figure 14:
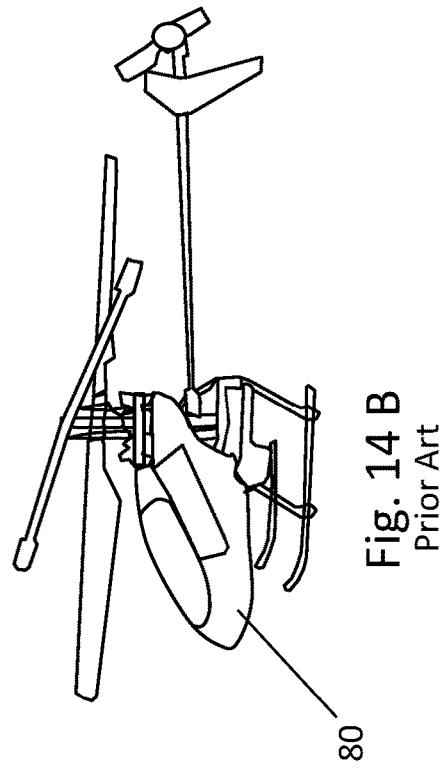
Figure 14:
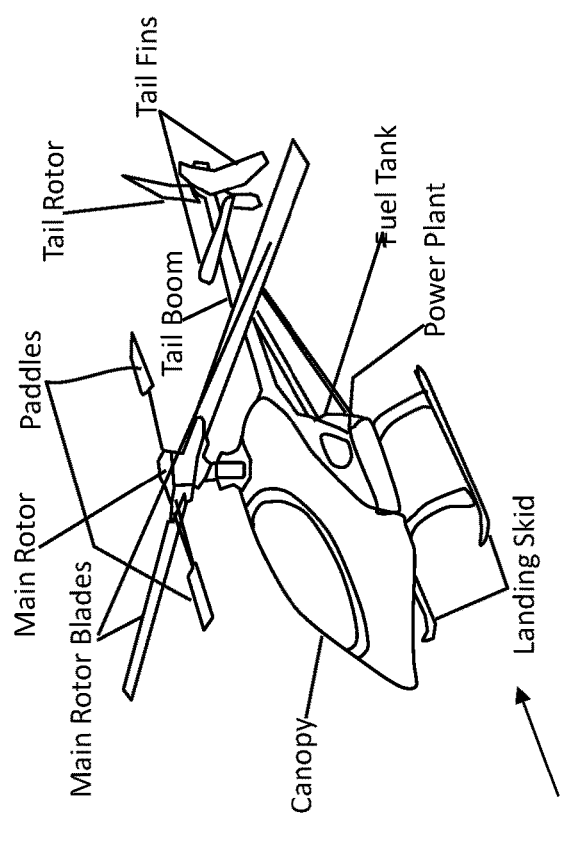
Figure 14:
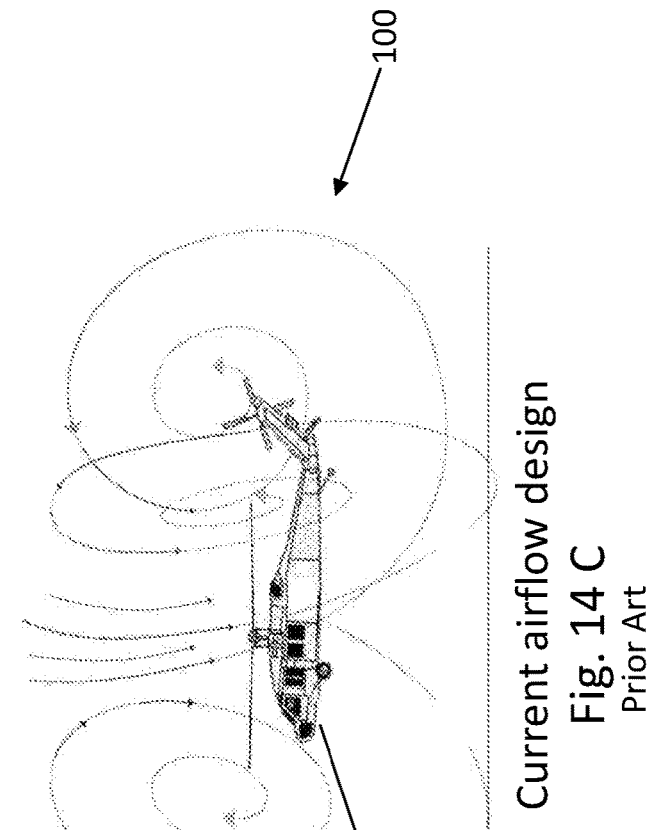

FIGS. 14 A through 14 C are additional typical parts of a helicopter and airflow reference sketches.

FIGS. 15 A through 15 D show a typical helicopter lift equation and basic reference sketches and parts of a helicopter.

FIGS. 16 A through 16 I are typical reference sketches of various helicopters, blades and masts.

REFERENCE NUMERALS

The following list refers to the drawings:

TABLE A

Reference numbers

| Ref # | Description |
|---|---|
| 30 | Blade 30 of the helicopter 80 with rotor tips upturned/inclined by a mechanical means 40 |
| 30A | Rotation action 30A of the rotor tip 30 moving |
| 31 | Configured means 31 for connecting tips 30 and blade 51 |
| 32 | Flap or hinging option 32 for end rotor tipping |
| 32A | Hinge option 32 in the up or raised position 32A to divert the air |
| 34 | Pivot point 34 for tipping at center of tip section 30 |
| 35 | Pivot point 35 at end of tip section 30 |
| 36 | Rod and/or tubular structure 36 to optionally hold tip sections completely separate from the main rotor blades 51 |
| 40 | Means 40 for inclining the tip - mechanical means may include using cables, hydraulics, electrical servomechanisms, cyclic/collective pitch mixing, or the application of weight adjustment using any of these means. Modern helicopters already are designed with flexible blades and pushrods, so modifications needed would be minor |
| 50 | Mast/rotor system 50 of the helicopter 80 |
| 51 | Simple blade/airfoil 51 of the helicopter 80 |
| 59 | Tail rotor mechanism 59 |
| 75 | Helicopter system 75 with the adapter mechanical rotor tip mechanical means |
| 80 | Typical helicopter 80 |
| 100 | Airflow/air movement and vortex 100 of air mass (and dust or mist) during landings and lift-offs of a helicopter |
| 110 | Beginning to land action 110 of helicopter 80 |
| 115 | Landing operation 115 of helicopter 80 in progress |
| 120 | Position 120 on the ground of helicopter 80 |
| 125 | Dust and mist cloud 125 post landing of helicopter 80 |
| 130 | Troops or personnel 130 in dust and mist cloud 125 |
| 150 | Improved dispersion 150 of dust and mist by tipped rotor blades 30 |
| 200 | How helicopters fly diagram/sketch 200 |
| 210 | Inside a helicopter cockpit sketch 210 |
| 220 | Sketch 220 of the basic parts of a helicopter rotor mast 50 |
| 230 | Sketch 230 of the basic parts of a helicopter 80 |
| 240 | Sketch 240 of directional flight of a helicopter 80 |
| 250 | Sketch 250 of hovering flight of a helicopter 80 |
| 260 | Lift equation 260 for a helicopter 80 |

DETAILED DESCRIPTION OF PREFERRED EMBODIMENT

The present development is a helicopter rotor device with a mechanical means for configuring rotor tips in order to control dust of brown outs or the method to accomplish the elimination of the brown out dust.

There is shown in FIGS. 1-16 a description and operative embodiment of the helicopter rotor device with a mechanical means for configuring rotor tips in order to control dust of brown outs or the method to accomplish the elimination of the brown out dust. In the drawings and illustrations, one notes well that the sketches and descriptions demonstrate the general configuration and examples but not limitations of device or method. Generally drawings FIGS. 1 through 7 help to show the device, FIGS. 8 through 11 show the operation and FIGS. 12 through 16 are provided as reference sketches, mostly described in the appendix. The various example uses are in the operation and use section, below.

The accompanying drawings, which are incorporated in and constitute a part of this specification, illustrate an embodiment of the helicopter rotor device 30 with a mechanical means for configuring rotor tips in order to control dust of brown outs or the method to accomplish the elimination of the brown out dust that is preferred. The drawings together with the summary description given above and a detailed description given below serve to explain the principles of the preferred and alternative devices and method.

FIGS. 1 A through 1 C are general sketches of helicopters 80 with mechanical rotor tips 30 on the blades 51, an array of means 40 for tipping the blades 51, and a typical vortex 100 flow lines of the air movement (wind) and dust.

FIGS. 2 A through 2 C are side, top and end views of a typical helicopter 80 before adaptation of the rotor tips. Demonstrated here are the typical helicopter 80, mast/rotor system 50 of the helicopter 80, simple blade/airfoil 51 of the helicopter 80, and tail rotor mechanism 59.

FIG. 3 is a typical helicopter after adaptation of the rotor tips. Demonstrated here are again the typical helicopter 80, mast/rotor system 50 of the helicopter 80, simple blade/airfoil 51 of the helicopter 80, and tail rotor mechanism 59. Also shown now is the blade 30 of the helicopter 80 with rotor tips up-turned/inclined by a mechanical means 40 and the rotation action 30A of the rotor tip 30 when it is moving into position to deflect and spoil the air flow.

FIGS. 4 A through 4 C are side, bottom and end views of a typical helicopter after adaptation of the rotor tips. Again are shown the typical helicopter 80, mast/rotor system 50 of the helicopter 80, simple blade/airfoil 51 of the helicopter 80, and tail rotor mechanism 59. Also shown now is the blade 30 of the helicopter 80 with rotor tips up-turned/inclined by a mechanical means 40 and the rotation action 30A of the rotor tip 30 when it is moving into position to deflect and spoil the air flow.

FIGS. 5 A through 5 D are flap tipping options 32 and multiple blade options of the rotor tip adaptation 30. In FIGS. 5 A and 5 B are shown the flap 32 tipping of the end of the rotor tip. Here there is a flap 32 that pivots up or essentially toward a vertical position 32A to create a disturbance of the air movement. Here the flap pivots/rotates along the front edge of the blade 51. In FIGS. 5 C and 5 D are sketches of the helicopter blades 51 where the helicopter 80 may have 2 or 3 sets of blades 51. The concept shows that the tips 30 may be on all or one of the blades to deflect and spoil the air movement and deflect the dust or mist to correct and remove the brown out/white out respectively. Here the tip rotated vertically from the blade 51 along a line or vector that runs across or essentially perpendicular to the top surface of the blade 51.

FIGS. 6 A through 6 D are optional means to accomplish the rotor tip adaptation for helicopter blades. FIG. 6 A shows the general rotor tip design with the typical helicopter 80, mast/rotor system 50 of the helicopter 80, simple blade/airfoil 51 of the helicopter 80, and tail rotor mechanism 59. Also shown now is the blade 30 of the helicopter 80 with rotor tips up-turned/inclined by a mechanical means 40 and the rotation action 30A of the rotor tip 30 when it is moving into position to deflect and spoil the air flow. By turning the rotor tips 30 past 0 degrees, as shown in FIG. 6 A, the effect on the rotor can straighten the blades under heavy loads by pushing tips/blades back down. The diagrams I through V, in FIG. 6 B, show the separate components of the blade 51 and the tip 30 with various configured means 31 for connecting them (51 and 30). These configured means 31 include, for example, cables, hinges, hydraulic and pneumatic couples and other mechanical couplings. This permits the means 40 for inclining the tip—mechanical means may include using cables, hydraulics, electrical servomechanisms, cyclic/collective pitch mixing, or the application of weight adjustment using any of these means to function properly. Note well that one skilled in the art and science of helicopter design appreciates well that the modern helicopters already are designed with flexible blades and pushrods, so modifications for inclining the rotor tip 30 needed would be a minor endeavor. Finally, FIGS. 6 C and 6 D show two means to pivot the end tips 30 about either a center pivot 34 or end pivot 35. These show the pivot point 34 for tipping at center of tip section 30 and the pivot point 35 at end of tip section 30. One skilled in the art of blade design appreciates that the rotor tips could be different in size and shape from the main rotor blade configuration—e.g. wider, thicker, of boxed or curved tips, feathered airfoils, etc.

FIGS. 7 A through 7 D are tipping 30 and straight blade 51 designs along with an optional straight blade 51 and rod or tubular structure 36 to optionally hold tip sections 30 completely separate from the main rotor blades 51. Here the with rotor tops 30 at the ends of the separate rod 36. One can note especially that FIG. 7 B demonstrates a separate rod/tube 36 and end flap blade 30 the end flap is an inclinable structure that can be added to a current existing helicopter 80 without disturbing the existing main rotor and its control system.

FIGS. 8 through 16 are shown below in the operation and reference appendix.

The details mentioned here are exemplary and not limiting. Other specific components and manners specific to describing a mechanical rotor tip blade device or method to eliminate brown may be added as a person having ordinary skill in the field of helicopter devices and their uses well appreciates.

Operation of the Preferred Embodiment

The helicopter rotor device 30 with a mechanical means for configuring rotor tips in order to control dust of brown outs or the method to accomplish the elimination of the brownout dust has been shown above. The manner of how the device operates is described below.

FIGS. 8 A through 8 D are examples of brown out conditions and resulting dust clouds during helicopter landings and lift-offs. Shown here are the helicopter 80 in the beginning to land action 110 of helicopter 80, a landing operation 115 of helicopter 80 in progress, the position 120 on the ground of helicopter 80, a dust and mist cloud 125 "post landing" of helicopter 80, and troops or personnel 130 walking their way out of a dust and mist cloud 125.

FIGS. 9 A through 9 D are sketches of vortexes of air movement and dust that compare blades with and without end rotor tipping. Here are sketches of the beginning to land action 110 of helicopter 80, landing operation 115 of helicopter 80 in progresses, and the comparison with the improved dispersion 150 (by the rotor tips 30) of dust and mist by tipped rotor blades 30 and standard straight 51 without tipped blades.

FIGS. 10 A and 10 B are sketches of vortexes of air movement and dust that compare blades—with and without end rotor tipping—during the landing and lift-off conditions. Here are sketches of the landing operation 115 of helicopter 80 in progress and the comparison with the improved dispersion 150 (by the rotor tips 30) of dust and mist by tipped rotor blades 30. The latter has a cleared condition without the brown out.

FIGS. 11 A through 11 E are sketches of top and side views of vortexes 100 of air movement and dust that compare blades with 51 and 30 and without 51 end rotor tipping phenomena. Shown are views of the airflow/air movement and vortex 100 of air mass (and dust or mist) during landings and lift-offs of a helicopter and improved dispersion 150 of dust and mist by tipped rotor blades 30.

Many uses are anticipated for the helicopter rotor device with a mechanical means for configuring rotor tips in order to control dust of brown outs or the method to accomplish the elimination of the brown out dust. The new design will push the dust- or debris-filled air further and lower than in the typical airflow. The new idea should force the air outward and downward, keeping the debris or dust lower to the ground, so that it is not recirculated. This will allow the rotors to pull in cleaner air from above, leading to a clearer view. This new idea can be used in any location and will clear the air for a less obstructed view and will improve air quality around engine intakes. By adding one or more sets of spoilers 30 to the rotors at or near the ends of the blades, will divert the typical air flow, "spoiling" the recirculation of the debris. Once on the surface, the new tips could be adjusted to a very aggressive position and used to clear the area of dust and debris, creating a giant fan effect, and pushing the dirty air away to increase vision and improve air quality for the pilot and machinery.

This fan effect could also be used in ways that do not relate to the helicopter itself. Such uses may include but are not limited to:

preventing crops from freezing clearing smoke intentionally spreading dust, sand or granular absorbents for a "soaking up" effect, such as in an oil spill.

With this description it is to be understood that the helicopter rotor device with a mechanical means for configuring rotor tips in order to control dust of brown outs or the method to accomplish the elimination of the brown out dust is not to be limited to only the disclosed embodiment of product. The features of the device 30 and methods to accomplish are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

Appendix a General Background as to how Helicopters Normally Operate:

The following is an addendum to the above specification for additional clarity and a general background as to how helicopters normally operate. The information is a reference for use and is fully incorporated by reference into the specification.

Helicopter Background:

Reference in general are in FIGS. 12 through 16.

FIGS. 12 A through 12 D are typical reference sketches of how helicopters fly, the cockpit, the rotor mast parts, and the typical parts of a helicopter.

FIGS. 13 A and 13 B are helicopter reference sketches portraying directional flight and hovering.

FIGS. 14 A through 14 C are additional typical parts of a helicopter and airflow reference sketches.

FIGS. 15 A through 15 D show a typical helicopter lift equation and basic reference sketches and parts of a helicopter.

FIGS. 16 A through 16 I are typical reference sketches of various helicopters, blades and masts.

Anatomy of a Helicopter: The Blade Are Spinning and the Engine Is Running—See FIG. 12 D.

Sikorsky is credited as one that brought a technical rigor to the field that finally made vertical flight safe, practical and reliable. He worked out the fundamental requirements that any such machine needed to have to be successful, including: a suitable engine with a high power-to-weight ratio; a mechanism to counteract rotor torque action; proper controls so the aircraft could be steered confidently and without catastrophic failures; a lightweight structural frame; and a means to reduce vibrations. Many of the basic parts seen on a modern helicopter grew out of the need to address one or more of these basic requirements.

Main rotor blade—The main rotor blade performs the same function essentially as an airplane's wings, providing lift as the blades rotate—lift being one of the critical aerodynamic forces that keeps aircraft aloft. A pilot can affect lift by changing the rotor's revolutions per minute (rpm) or its angle of attack, which refers to the angle of the rotary wing in relation to the oncoming wind.

Stabilizer—The stabilizer bar sits above and across the main rotor blade. Its weight and rotation dampen unwanted vibrations in the main rotor, helping to stabilize the craft in all flight conditions.

Rotor mast—Also known as the rotor shaft, the mast connects the transmission to the rotor assembly. The mast rotates the upper swash plate and the blades.

Transmission—Similar to a motor vehicle, a helicopter's transmission transmits power from the engine to the main and tail rotors. The transmission's main gearbox steps down the speed of the main rotor so it does not rotate as rapidly as the engine shaft. A second gearbox does the same for the tail rotor, although the tail rotor, being much smaller, can rotate faster than the main rotor.

Engine—The engine generates power for the aircraft. Early helicopters relied on reciprocating gasoline engines, but modern helicopters use gas turbine engines like those found in commercial airliners.

Anatomy of a Helicopter: Working the Controls—See FIG. 12 B.

Fuselage—The main body of the helicopter is known as the fuselage. In many models, a frameless plastic canopy surrounds the pilot and connects in the rear to a flush-riveted aluminum frame. Aluminum wasn't widely used in aeronautical applications until the early 1920s, but its appearance helped engineers make their helicopters lighter and, as a result, easier to fly.

Cyclic-pitch lever—A helicopter pilot controls the pitch, or angle, of the rotor blades with two inputs: the cyclic-lever and collective-pitch levers often just shortened to the cyclic and the collective. The cyclic, or "stick," comes out of the floor of the cockpit and sits between the pilot's legs, enabling a person to tilt the craft to either side or forward and backward. Collective-pitch lever—The collective-pitch lever is responsible for up-and-down movements. For example, during takeoff, the pilot uses the collective-pitch lever to increase the pitch of all the rotor blades by the same amount. Foot pedals—A pair of foot pedals controls the tail rotor. Working the pedals affects which way the helicopter points, so pushing the right pedal deflects the tail of the helicopter to the left and the nose to the right; the left pedal turns the nose to the left. Tail boom—The tail boom extends out from the rear of the fuselage and holds the tail rotor assemblies. In some models, the tail boom is nothing more than an aluminum frame. In others, it's a hollow carbon-fiber or aluminum tube. Anti-torque tail rotor—Without a tail rotor, the main rotor of a helicopter simply spins the fuselage in the opposite direction. Sikorsky had the idea to install a tail rotor to counter this torque reaction and provide directional control. In twin-rotor helicopters, the torque produced by the rotation of the front rotor is offset by the torque produced by a counter-rotating rear rotor. Landing skids—Some helicopters have wheels, but most have skids, which are hollow tubes with no wheels or brakes. A few models have skids with two ground-handling wheels. The main rotor, of course, is the most important part of a helicopter. It is also one of the most complex in terms of its construction and operation. In the next section, we'll peer at the rotor assembly of a typical helicopter.

The Heart of the Helicopter: The Rotor Assembly—See FIG. 12 C. A helicopter's main rotor is the most important part of the vehicle. It provides the lift that allows the helicopter to fly, as well as the control that allows the helicopter to move laterally, make turns and change altitude. To handle all of these tasks, the rotor must first be incredibly strong. It must also be able to adjust the angle of the rotor blades with each revolution they make. The pilot communicates these adjustments through a device known as the swash plate assembly. The awash plate assembly consists of two parts—the upper and lower swash plates. The upper swash plate connects to the mast, or rotor shaft, through special linkages. As the engine turns the rotor shaft, it also turns the upper swash plate and the rotor blade system. This system includes blade grips, which connect the blades to a hub. Each hub contains a rubbery bearing sandwiched between metal plates that allow its blade to flap up or down. Control rods from the upper swash plate have a connection point on the hubs, making it possible to transfer movements of the upper swash plate to the blades. And the hubs themselves mount to the mast via the Jesus nut, so named because its failure is said to bring a pilot face-to-face with Jesus. The lower swash plate is fixed and doesn't rotate. Ball bearings lie between the upper and lower swash plates, allowing the upper plate to spin freely on top of the lower plate. Control rods attached to the lower swash plate connect to the cyclic- and collective-pitch levers. When the pilot operates either of those two levers, his or her inputs are transmitted, via the control rods, to the lower swash plate and then, ultimately, to the upper swash plate. Using this rotor design, a pilot can manipulate the swash plate assembly and control the helicopter's motion. With the cyclic, the swash plate assembly can change the angle of the blades individually as they revolve. This allows the helicopter to move in any direction around a 360-degree circle, including forward, backward, and left and right. The collective allows the swash plate assembly to change the angle of all blades simultaneously. Doing this increases or decreases the lift that the main rotor supplies to the vehicle, allowing the helicopter to gain or lose altitude.

How Helicopters Fly—See FIG. 12 A.

Imagine one has created a machine that can simply fly straight upward. One does not yet worry about getting back down for the moment—up is all that matters. To provide the upward force with a wing, then the wing has to be in motion in order to create lift. Wings create lift by deflecting air downward and benefiting from the equal and opposite reaction that results A rotary motion is the easiest way to keep a wing continuously moving. One can mount two or more wings on a central shaft and spin the shaft, much like the blades on a ceiling fan. The rotating wings of a helicopter are shaped just like the airfoils of an airplane wing, but generally the wings on a helicopter's rotor are narrow and thin because they must spin so quickly. The helicopter's rotating wing assembly is normally called the main rotor. If the main rotor wings have a slight angle of attack on the shaft and spin the shaft, the wings can start to develop lift. In order to spin the shaft with enough force to lift a human being and the vehicle, the helicopter needs an engine, typically a gas turbine engine. The engine's driveshaft can connect through a transmission to the main rotor shaft. This arrangement works really well until the moment the vehicle leaves the ground. At that moment, there is nothing to keep the engine (and therefore the body of the vehicle) from spinning just as the main rotor does. In the absence of anything to stop it, the body of the helicopter will spin in an opposite direction to the main rotor. To keep the body from spinning, there needs to be a force applied to it. Hence, enter the tail rotor. The tail rotor produces thrust like an airplane's propeller does. By producing thrust in a sideways direction, this critical part counteracts the engine's desire to spin the body. Normally, the tail rotor is driven by a long driveshaft that runs from the main rotor's transmission back through the tail boom to a small transmission at the tail rotor.

In order to actually control the machine and, say, guide it into a canyon to complete the ultimate rescue, both the main rotor and the tail rotor need to be adjustable. The next sections explain how pilots guide the helicopter into taking off, hovering or buzzing off in a particular direction.

Flying a Helicopter: Taking Off

The ability of helicopters to move laterally in any direction or rotate 360 degrees makes them exciting to fly, but piloting one of these machines requires great skill and dexterity. To control a helicopter, the pilot grips the cyclic in one hand, the collective in the other. At the same time, his feet must operate the foot pedals that control the tail rotor, which allows the helicopter to rotate in either direction on its horizontal axis. It takes both hands and both feet to fly a helicopter!

During takeoff, the pilot works the collective and the foot pedals simultaneously. Before discussing how to take off, one should know that the collective typically looks like a handbrake whose grip functions as the throttle. Twisting the grip controls the power output of the engine, increasing or decreasing the speed of the main rotor. With that in mind, one is ready to begin a typical helicopter takeoff:
1. First, the pilot opens the throttle completely to increase the speed of the rotor.
2. Next, he or she pulls up slowly on the collective. The collective control raises the entire swash plate assembly as a unit. This has the effect of changing the pitch of all rotor blades by the same amount simultaneously.
3. As the pilot increases collective pitch, he or she depresses the left foot pedal to counteract the torque produced by the main rotor.
4. The pilot keeps pulling up slowly on the collective while depressing the left foot pedal.
5. When the amount of lift being produced by the rotor exceeds the weight of the helicopter, the aircraft will get light on its skids and slowly leave the ground.

At this point, the pilot feels the cyclic become sensitive. He or she grips the cyclic and, in most cases, nudges the helicopter forward. Directional flight is the topic of the next section.

Flying a Helicopter: Directional Flight—FIG. 13 A.

In addition to moving up and down, helicopters can fly forward, backward and sideways. This kind of directional flight is achieved by tilting the swash plate assembly with the cyclic, which alters the pitch of each blade as it rotates. As a result, every blade produces maximum lift at a particular point. The rotor still generates lift, but it also creates thrust in the direction that the swash plate assembly is tilted. This causes the helicopter to lean—and fly—in a certain direction. The pilot can impart additional directional control by depressing or easing up on the foot pedals, which increases or decreases the counteracting thrust of the tail rotor. Now one assumes for a moment that the helicopter just discussed needs to fly forward. This is the pilot's procedure:
1. First, he or she nudges the cyclic lever forward.
2. That input is transmitted to the lower swash plate and then to the upper swash plate.
3. The swash plates tilt forward at an amount equal to the input.
4. The rotor blades are pitched lower in the front of the rotor assembly than behind it.
5. This increases the angle of attack—and creates lift—at the back of the helicopter.
6. The unbalanced lift causes the helicopter to tip forward and move in that direction.

When the aircraft reaches about 15 to 20 knots of forward airspeed, it begins to transition from hovering flight to full forward flight. At this point, known as effective translational lift, or ETL, the pilot eases up on the left foot pedal and moves closer to a neutral setting. He or she also feels a shudder in the rotor system as the helicopter begins to fly out of rotor wash (the turbulence created by a helicopter's rotor) and into clean air. In response, the rotor will try to lift up and slow the aircraft automatically. To compensate, the pilot will continue to push the cyclic forward to keep the helicopter flying in that direction with increasing airspeed.

A helicopter that is flying forward can stop in mid-air and begin hovering very quickly. Flying a Helicopter: Hovering—FIG. 13 B. The defining characteristic of a helicopter is its ability to hover at any point during a flight. To achieve hovering, a pilot must maintain the aircraft in nearly motionless flight over a reference point at a constant altitude and on a heading (the direction that the front of the helicopter is pointing). This may sound easy, but it requires tremendous experience and skill.

Before discussing the technique of hovering, one needs to take a moment to discuss nap-of-the-earth (NOE) flight, another unique characteristic of helicopters. NOE flight describes a helicopter located just above the ground or any obstacles on the ground. Military pilots perfected the technique during Vietnam as a means to become more elusive to ground-based weapons. In fact, film footage from the era often shows helicopters rapidly skimming the Earth's surface, machine-gunners firing from open rear doors or hovering with their skids just a few feet off the ground as troops disembark at a target location. Of course, any helicopter taking off or landing must undertake NOE flight, if only for a few moments. It's a particularly critical time for a helicopter because a wild attitude adjustment could tip the craft too far and bring the rotor blades in contact with an obstacle. Attitude, for our purposes, refers to the helicopter's orientation in relation to the helicopter's direction of motion. You'll also hear flight-minded folks talk about attitude in reference to an axis, such as the horizon.

With that said, the basic technique to bring a helicopter into a hovering position is:
1. First, the pilot must cease any directional flying. For example, if flying the helicopter forward, the pilot must ease back on the cyclic until the helicopter's forward motion stops and the aircraft remains motionless over a point on the ground.
2. Next, it's important that the pilot can detect small changes in the aircraft's altitude or attitude. He or she accomplishes this by locating a fixed point outside the cockpit and tracking how the helicopter moves relative to that point.
3. Finally, the pilot adjusts the collective to maintain a fixed altitude and adjusts the foot pedals to maintain the direction that the helicopter is pointing.

To maintain a stabilized hover, the pilot must make small, smooth, coordinated corrections on all of the controls. In fact, one of the most common errors of novice pilots is to overcompensate while trying to hover. For example, if the helicopter begins to move rearward, the pilot must be careful not to apply too much forward pressure on the cyclic because the aircraft will not just come to a stop but will start drifting forward. Over the years, innovations in helicopter design have made the machines safer, more reliable and easier to control. The next page presents a few of these innovations to provide a glimpse of how far helicopters have come and where they might go in the future.

What is claimed is:

1. A helicopter rotor tipping device comprised of:
   (a) a blade/airfoil (51) of the helicopter (80);
   (b) an up-movable and rotatable set of rotor tips (30);
   (c) a configured mechanical means (31) for connecting the rotor tips (30) and the blade/airfoil (51); and
   (d) a means (40) for inclining the rotor tips (30) whereby the rotor tips (30) can rotate upwards which results in a sudden vertical down blast of air and resultant down blast forces a vertically downward and an outward dispersion (150) of an air movement and an air mass
   wherein the outward and vertically downward dispersion (150) of the air movement and the air mass, including a dust or mist present during landings and lift-offs of the helicopter (80), eliminates brownout condition and provides a sight path to enable a helicopter pilot to land the helicopter with less obstructed view.

2. The device according to claim 1 wherein the configured mechanical means for connecting (31) is a flap (30) that pivots/rotates along a front edge of the blade (51).

3. The device according to claim 1 wherein the configured mechanical means for connecting (31) is a flap (30) that pivots/rotates vertically from the blade (51) along a line or vector that runs across essentially perpendicular to a top surface of the blade (51).

4. The device in claim 3 wherein the configured mechanical means for connecting the rotor tips (30) and the blade/airfoil (51) is a rotatable pivot that is essentially centered on a length of the flap (30).

5. The device in claim 1 wherein the means (40) for inclining the rotor tips (30) is a mechanical means using cables.

6. The device in claim 1 wherein the means (40) for inclining the rotor tips (30) is a mechanical means using hydraulics.

7. The device in claim 1 wherein the means (40) for inclining the rotor tips (30) is a mechanical means using electrical servomechanisms.

8. The device in claim 1 wherein the means (40) for inclining the rotor tips (30) is a mechanical means using cyclic/collective pitch mixing.

9. The device in claim 1 wherein the means (40) for inclining the rotor tips (30) is a mechanical means using pneumatics.

10. An improved method of mechanical control to enable rotor tips of a helicopter main rotor blade to incline upward, the improved method of mechanical control comprising:
    Step 1: beginning to land a helicopter;
    Step 2: creating a landing vortex;
    Step 2.1: inclining the tips by engaging the means (40) for inclining the tip;
    Step 2.2: rotating the tips of the rotor;
    Step 3: landing the helicopter;
    Step 4: positioning the helicopter on the ground; and
    Step 5: encountering by troops improved dispersion post landing
    whereby the rotor tips (30) can rotate upwards which results in a sudden vertical down blast of air and resultant down blast forces a vertically downward and an outward dispersion (150) of an air movement and an air mass
    wherein the outward and vertically downward dispersion (150) of the air movement and the air mass, including a dust or mist present during landings and lift-offs of the helicopter (80), eliminates brownout condition and provides a sight path to enable a helicopter pilot to land the helicopter with less obstructed view.

11. The method of mechanical control in claim 10 which further enables a rotor tip of a helicopter auxiliary rotor blade to be configured on a tube and an end flap which is an inclinable structure
    wherein the rotor tip of the helicopter auxiliary rotor blade can be inclined and thereby improve a dispersion of airflow/air movement and a vortex of air mass during landings and lift-offs of the helicopter.

12. The method of claim 11 wherein inclining to the inclinable structure is accomplished by using a mechanical means.

13. The method of claim 12 wherein the mechanical means is selected from the group consisting of a mechanical means using cables; a mechanical means using hydraulics; a mechanical means using electrical servomechanisms; a mechanical means using cyclic/collective pitch mixing; and a mechanical means using pneumatics.

* * * * *